United States Patent

Nomiyama

[11] Patent Number: 5,973,720
[45] Date of Patent: Oct. 26, 1999

[54] FOCUSING METHOD, LIGHT BEAM OPTICAL SYSTEM USED THEREFOR, AND IMAGE FORMING APPARATUS USING SAME

[75] Inventor: Takashi Nomiyama, Nakai-machi, Japan

[73] Assignee: Fuji Xerox Co., Ltd., Tokyo, Japan

[21] Appl. No.: 08/958,152

[22] Filed: Oct. 27, 1997

[30] Foreign Application Priority Data

Nov. 6, 1996 [JP] Japan .................................. 8-310131

[51] Int. Cl.⁶ .............................. B41J 2/47; G01D 15/34; G02B 26/00
[52] U.S. Cl. ........................ 347/256; 250/201.2; 359/319
[58] Field of Search .................................... 347/116, 234, 347/134, 235, 256, 242, 225, 258; 250/201.2, 201.4, 201.5, 235; 359/216, 196, 208, 205; 358/494; 369/102

[56] References Cited

U.S. PATENT DOCUMENTS

| | | | |
|---|---|---|---|
| 5,103,091 | 4/1992 | Hirose et al. | 347/225 |
| 5,220,450 | 6/1993 | Iizuka | 359/205 |
| 5,283,681 | 2/1994 | Hoshino et al. | 250/201.2 |
| 5,426,528 | 6/1995 | Yamamoto et al. | 250/235 |
| 5,498,869 | 3/1996 | Appel et al. | 250/236 |
| 5,696,622 | 12/1997 | Sumi | 359/319 |
| 5,703,860 | 12/1997 | Fukunaga et al. | 347/242 |
| 5,841,465 | 11/1998 | Fukunaga et al. | 347/258 |
| 5,856,669 | 1/1999 | Nagasaka et al. | 250/235 |
| 5,883,385 | 3/1999 | Takahashi et al. | 250/235 |

FOREIGN PATENT DOCUMENTS 2-289812  11/1990  Japan .

*Primary Examiner*—N. Le
*Assistant Examiner*—L. Anderson
*Attorney, Agent, or Firm*—Oliff & Berridge, PLC

[57] ABSTRACT

A light beam optical system is provided according to the present invention for focusing light beams from a light source on the surface of a photoconductive drum and the like via an optical system. This light beam optical system is capable of adjusting focal dislocation with high precision without being influenced by adhesion of toner for forming an image and the like to the photoconductive drum and the like or by change in the position of a light receiving section generated due to temperature change and the like. The light beam optical system comprises an optical system for focusing light beams from a light source on a photoconductive drum, a light receiving section for detecting on which of the front side or the rear side of the photoconductive drum light beams are focused, and control device for controlling the optical system based upon the detected result so that light beams are focused on the photoconductive drum.

14 Claims, 26 Drawing Sheets

FOCUSING METHOD, LIGHT BEAM OPTICAL SYSTEM USED THEREFOR, AND IMAGE FORMING APPARATUS USING SAME

BACKGROUND OF THE INVENTION

1. Field of the Invention

The present invention relates to a focusing method when light beams from a light source is focused on the surface of a photoconductive drum or the like via an optical system, a light beam optical system used for implementing the focusing method and an image forming apparatus using the same. Particularly, the present invention relates to a focusing method using a semiconductor laser or the like for a light source for precisely detecting the dislocation of a focus caused by variation in the light quantity of an optical system due to the change of temperature or aging change and the like, an error in the assembly and adjustment of the optical system and the like, and correcting it with high precision, a light beam optical system used for implementing the focusing method and an image forming apparatus using the same.

2. Description of the Related Art

In a laser beam optical system provided with an optical scanner, light beams outgoing from a semiconductor laser passes through A light beam optical system such as a collimating lens, a polygon mirror and fθ lens, is focused and radiated on a photoconductive drum, however, there is a problem that a focal position on the surface of the photoconductive drum is varied by change in the conditions of an optical system due to temperature change or aging change, variation in an irritated position due to the rotational eccentricity of the photoconductive drum, an error in assembly and adjustment and the like, and a predetermined light beams diameter cannot be obtained on the surface of the photoconductive drum. In this case, it is required of correcting light beams diameter by detecting a state in which light beams is focused on the surface of a photoconductive drum or in a predetermined position and shifting a part of an optical system in an optical path, that is, correction for focal dislocation.

For the solution of such a problem, light beams recorder for correcting the focal dislocation of light beams by shifting one optical element constituting an imaging optical system in the direction of an optical axis is disclosed in Japanese Published Unexamined Patent application No. H2-289812.

Referring to FIG. 34, the constitution of the above light beams recorder will be described below. The light beams recorder shown in FIG. 34 is provided with a semiconductor laser 101 for radiating light beams and a collimating lens 102 for collimating diffused light beams radiated from the semiconductor laser 101. The collimating lens 102 is constituted so that it can focus by being moved in the direction of an optical axis by a focusing mechanism 103. Parallel beams outgoing from the collimating lens 102 are reflected and deflected by light beams deflecting system 104. Light beams 105 deflected by the light beams deflecting system 104 is incident on fθ lens 106 and focused on the surface of a photoconductive drum 107. The photoconductive drum 107 is provided with an automatic focus (AF) pattern formed range 107a and an image formed range 107b on the surface. A motor 108 rotates the photoconductive drum 107 and outputs a pulse signal in a predetermined cycle according to an encoder.

Light beams reflected in the AF pattern formed range 107a is received by a photodiode 110 via a condenser 109. An AF control circuit 111 operates the focusing mechanism 103 based upon output from the photodiode 110, that is, the diameter of a converged beam on the surface of the photoconductive drum 107, moves the collimating lens 102 in the direction of an optical axis and controls the rotational cycle of the photoconductive drum 107 and the operating timing of the focusing mechanism 103 according to a pulse signal output from the motor 108. A laser driver 112 is used for radiating light beams modulated by the semiconductor laser 101 according to a picture signal and for radiating a fixed quantity of light beams from the semiconductor laser 101 according to an AF operating signal.

The AF pattern formed range 107a is constituted by a reflection type grating pattern and others for reflecting light beams for scanning the surface of the photoconductive drum 107 in the photodiode 110 at predetermined lattice pitch, and the reflection type grating pattern is formed around the photoconductive drum 107 in the vertical scanning direction.

In the above constitution, when a fixed quantity of light beams are radiated from the semiconductor laser 101 according to an AF operating signal, the light beams are deflected by the light beams deflecting system 104 after they are collimated by the collimating lens 102 and scan the surface of the photoconductive drum 107 via the fθ lens 106. At this time, light beams reflected in the AF pattern formed range 107a is received by the photodiode 110 via the condenser 109 and a signal according to the beam diameter on the surface of the photoconductive drum 107 is output from the photodiode 110 to the AF control circuit 111. The AF control circuit 111 receives a signal from the photodiode 110 at predetermined timing according to a pulse signal output from the motor 108, moves the collimating lens 102 in the direction of an optical axis by operating the focusing mechanism 103 according to the received signal and corrects the variation of the diameter of a converged beam on the surface of the photoconductive drum 107, that is, the focal dislocation of light beams.

However, according to a conventional type light beams recorder, there is a serious problem that as the quantity of light beams reflected from the photoconductive drum is detected and focal dislocation is corrected based upon the detected quantity, the decrease of reflected light quantity or the unevenness of reflected light quantity in distribution occurs in case toner and others for forming an image adhere to the photoconductive drum and others and hereby, the precision of the correction of focal dislocation is greatly reduced or correction is disabled. The problem that toner and others adhere, as a result, the decrease of reflected light quantity or the unevenness of reflected light quantity in distribution occurs and therefore, the problem that the precision of correction is greatly reduced or correction is disabled is an essential defect which a method of detecting the reflected quantity of light beams reflected from the photoconductive drum has. This is because it cannot be distinguished whether the variation of detected quantity is caused by focal dislocation or by a stain by toner and others.

Also, according to the conventional type light beams recorder, as the quantity of light beams reflected from the photoconductive drum is detected by light beams receiving means arranged in an initialized position, the precision of the correction of focal dislocation is deteriorated in case the position of the light beams receiving means is varied due to temperature and others. This is because as the reflected light quantity of light beams is detected based upon the light beams receiving means arranged in the initialized position, detected quantity also varies when positional relationship between the light beams receiving means and the photoconductive drum is varied. A problem that the precision of the correction of focal dislocation is deteriorated because of the variation of the positional relationship is an essential defect which a focal dislocation detecting mechanism based upon the light beams receiving means arranged in the initialized position has. This is because it cannot be distinguished whether the variation of detected light quantity is caused by focal dislocation or by the variation of positional relationship between the light beams receiving means and the photoconductive drum.

Also, according to the conventional type light beams recorder, if the quantity of dislocation is the same even if the focal position of light beams is dislocated on the side of a light source apart from the photoconductive drum or on the side reverse to the light source, there is a problem that the direction of focal dislocation cannot be distinguished because the diameter of detected converged beams is the same and it takes much time for the focal dislocation of light beams to be corrected.

SUMMARY OF THE INVENTION

The object of the present invention is to provide a focusing method in which even if toner and the like for forming an image adhere to a photoconductive drum and others, focal dislocation can be adjusted with high precision without being influenced by toner and the like.

Also, the object of the present invention is to provide a focusing method in which even if the position of light beams receiving section is varied due to temperature and the like, focal dislocation can be adjusted with high precision without being influenced by it.

Further, the object of the present invention is to provide a high precision focus detecting method in which the direction of focal dislocation can be also distinguished.

Also, another object of the present invention is to provide an optical system used when the above focus detecting method is executed.

Further, the other object of the present invention is to provide an image forming apparatus mounting the above optical system.

The above object is achieved by a focusing method comprising the steps of: converging light beams on a rotated image former; determining on which side of the front side or the rear side of the image former light beams is focused, while receiving light reflected on the image former of light beams; and moving the focal position of a light beam based upon the discrimination and focusing the light beams on the image former. Further, the above object is also achieved by a focusing method comprising the steps of: converging light beams on a bright and dark pattern formed in the circumferential direction of a rotated image former; dividedly receiving the reflected light of light beams modulated by the bright and dark pattern at plural light receiving areas; determining on which side of the front side or the rear side of the image former light beams are focused based upon the time change of difference in the intensity of received light among the plural light receiving areas and shifting the focal position of light beams based upon the above judgment to focus the light beams on the image former. In this case, the image former means a photoconductive drum used for an image forming apparatus in an electrophotographic method and others. For light beams, light outgoing from a light source such as a semiconductor laser is used.

According to the above focusing method according to the present invention, as a reflected laser beam influenced by a bright and dark pattern formed on a photoconductive drum is received, not the quantity of the reflected light of light beams but the state of the reflected light, that is, a state in which the laser beam is focused on the front side of the photoconductive drum or on the rear side is detected and focusing is executed based upon the detected state, the variation of the quantity of the reflected laser beam and others are not influenced even if toner for forming an image and others adhere on the photoconductive drum and others and the quantity of the reflected laser beam is reduced or the distribution of the quantity of light is uneven, focusing operation is not influenced as long as the state of a laser beam is detected and focal dislocation can be corrected with high precision.

Also, according to the focusing method according to the present invention, as a state in which a laser beam is focused on the front side of a photoconductive drum or on the rear side is detected as described above, focusing operation is not influenced as long as the state of a laser beam is detected even if the position of light receiving means is varied due to temperature and others and the high precision correction of focal dislocation independent of the quantity of the reflected light of light beams and positional relationship between light receiving means and a photoconductive drum is enabled.

Further, according to the focusing method according to the present invention, as a state in which a laser beam is focused on the front side of a photoconductive drum or the rear side is detected as described above, the direction of focal dislocation can be also distinguished and focusing operation is enabled by simple constitution.

Further, the above object is achieved by an optical system comprising a light source for radiating light beams, optical means for focusing light beams on an image former and convergent state detecting means for detecting a convergent state of light beams on the image former. In the optical system, the convergent state detecting means detects a first focal state in which light beams is focused on the front side of the image former and a second focal state in which light beams is focused on the rear side of the image former.

Also, the convergent state detecting means is provided with a reflecting part provided with an area different in reflectance in a part of the surface of the image former and a detecting section for detecting the first or second focal state based upon the reflected light of light beams reflected in the reflecting part. The reflecting part is provided with a pattern formed so that reflectance is periodically different in the rotational direction of the image former.

The detecting section is provided with a light receiving section provided with plural light receiving surfaces for dividedly receiving reflected light into plural areas. The detecting section is also provided with an optical element for dividedly receiving reflected light into first and second reflected light, a first light receiving section provided with plural light receiving surfaces for dividedly receiving the first reflected light at plural areas and a second light receiving section provided with plural light receiving surfaces for dividedly receiving the second reflected light at plural areas.

Further, the convergent state detecting means may be also provided with a focusing optical system arranged between a reflecting part and a light receiving section so that focused reflected light may be always focused on either of the front side or the rear side for focusing reflected light.

A light source may be also constituted so that it radiates light beams for detection for detecting the convergent state of light beams in addition to light beams modulated according to a picture signal. For example, a light source may be also constituted so that it is provided with an emitting array for writing an image for radiating plural light beams for writing an image and an emitting section for detection arranged next to the emitting array for writing an image for radiating light beams for detection.

Further, the optical system may be further provided with control means for controlling the relative position of a light source, optical means and an image former so that light beams is focused on the image former according to a detected focal state. The control means may be also provided with an operation section for generating a continuous control signal based upon the reflected light of light beams discretely detected by the convergent state detecting means and a driving section for driving the optical means according to a control signal.

As described above, according to the optical system according to the present invention, as a reflected laser beam influenced by a bright and dark banded pattern formed on a photoconductive drum is received, it is detected whether a laser beam is focused on the front side of the photoconductive drum or on the rear side and focusing operation is executed according to the result, the quantity of reflected laser beams and others are not influenced even if toner for forming an image and others adhere to the photoconductive drum and others and the quantity of reflected laser beams decreases or the distribution of the quantity of reflected laser beams is uneven, focusing operation is not influenced as long as the state of a laser beam is detected and the high precision correction of focal dislocation is enabled.

Also, according to the optical system according to the present invention, as it is detected whether a laser beam is focused on the front side of a photoconductive drum or on the rear side as described above, focusing operation is not influenced as long as the state of a laser beam is detected even if the position of light receiving means is varied due to temperature and others and the high precision correction of focal dislocation is enabled.

Further, according to the optical system according to the present invention, as it is detected whether a laser beam is focused on the front side of a photoconductive drum or on the rear side as described above, the direction of focal dislocation can be also distinguished and focusing operation is enabled with simple constitution.

Also, the above object is achieved by an image forming apparatus characterized in that the optical system described in any of the above is mounted in the image forming apparatus provided with a rotary photoconductive drum on which light beams modulated according to a picture signal is radiated, developing means for depositing toner on an electrostatic latent image formed on the rotary photoconductive drum and developing it, transfer means for transferring the toner on paper and fixing means for fixing the toner on the paper.

Also, the above object is achieved by an image forming apparatus characterized by being provided with a light source for radiating light beams modulated according to a picture signal, optical means for converging the light beams on a rotary photoconductive drum, convergent state detecting means for detecting the convergent state on an image former of the light beams, control means for controlling the relative position of the light source, the optical means and the rotary photoconductive drum so that the light beams is converged on the rotary photoconductive drum according to a detected convergent state, developing means for depositing toner on an electrostatic latent image formed on the rotary photoconductive drum and developing it, transfer means for transferring the toner on paper and fixing means for fixing the toner on the paper.

DESCRIPTION OF THE PREFERRED EMBODIMENTS

Figure 1:
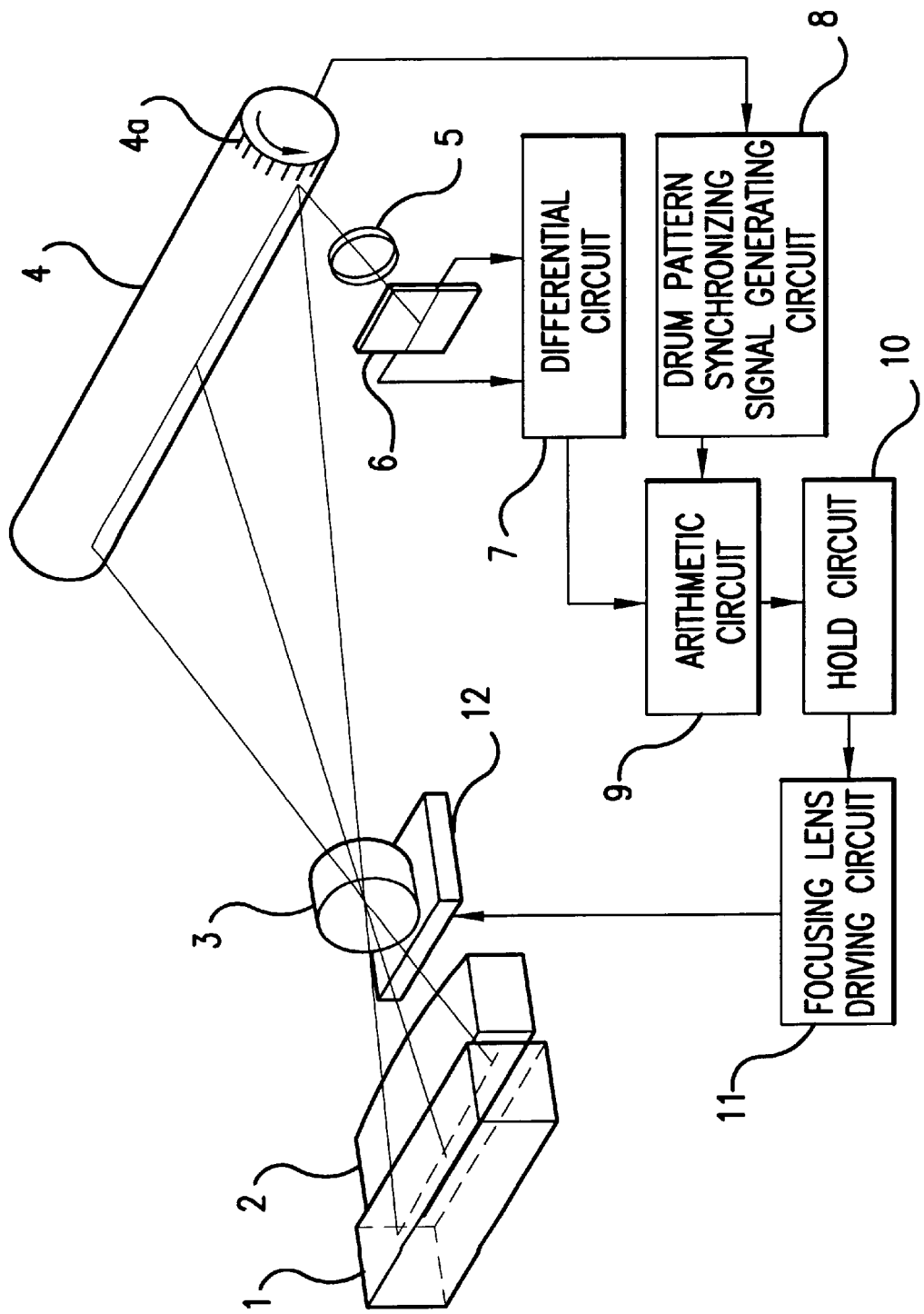
FIG. 1 shows an outline of the constitution of a laser beam optical system equivalent to a first embodiment of the present invention.

Referring to FIGS. 1 to 18, a laser beam optical system equivalent to a first embodiment of the present invention will be described below. FIG. 1 shows an outline of the constitution of the laser beam optical system equivalent to this embodiment. As shown in FIG. 1, the laser beam optical system equivalent to this embodiment is provided with a semiconductor laser array 1 for radiating a laser beam according to image information and a field lens 2 for focusing laser beams outgoing from the semiconductor laser array 1 in a first direction. A focusing lens 3 for focusing laser beams outgoing from the semiconductor laser array 1 in a predetermined beam diameter is provided on an optical path on the outgoing side of the field lens 2.

A photoconductive drum 4 is provided in the focused position of laser beams focused by the focusing lens 3. A drum pattern part 4a consisting of a bright part and a dark part which are different in reflectance is formed at the end on the circumferential surface of the photoconductive drum 4. A condensing lens 5 for focusing a laser beam reflected on the surface of the drum pattern part 4a of the photoconductive drum 4 in a predetermined direction and a predetermined position is provided in a predetermined position for the photoconductive drum 4. A light receiving section 6 for receiving a laser beam focused by the condensing lens 5 is provided on an optical path of the condensing lens 5.

The laser beam optical system equivalent to this embodiment is provided with a differential circuit 7 for generating a signal according to the focal dislocation of a laser beam based upon the intensity or the radiated quantity of a laser beam received by the light receiving section 6 and a drum pattern synchronizing signal generating circuit 8 for generating a drum pattern synchronizing signal based upon a synchronizing signal synchronized with the cycle of the bright and dark parts of the drum pattern part 4a according to the rotation of the photoconductive drum 4 and generated as the processing/control system of the above laser beam optical system. Further, the above laser beam optical system is provided with an arithmetic circuit 9 for generating an output signal sampled from a signal output from the differential circuit 7 and the drum pattern synchronizing signal generating circuit 8 and a hold circuit 10 for smoothing a signal output from the arithmetic circuit 9 so that it can be used as a control signal. The above laser beam optical system is furthermore provided with a focusing lens driving circuit 11 for driving the focusing lens 3 according to a signal output from the hold circuit 10 and a focusing actuator 12 for driving the focusing lens 3 according to a signal output from the focusing lens time relationship between the bright and dark banded pattern and the above signal.

Figure 3:
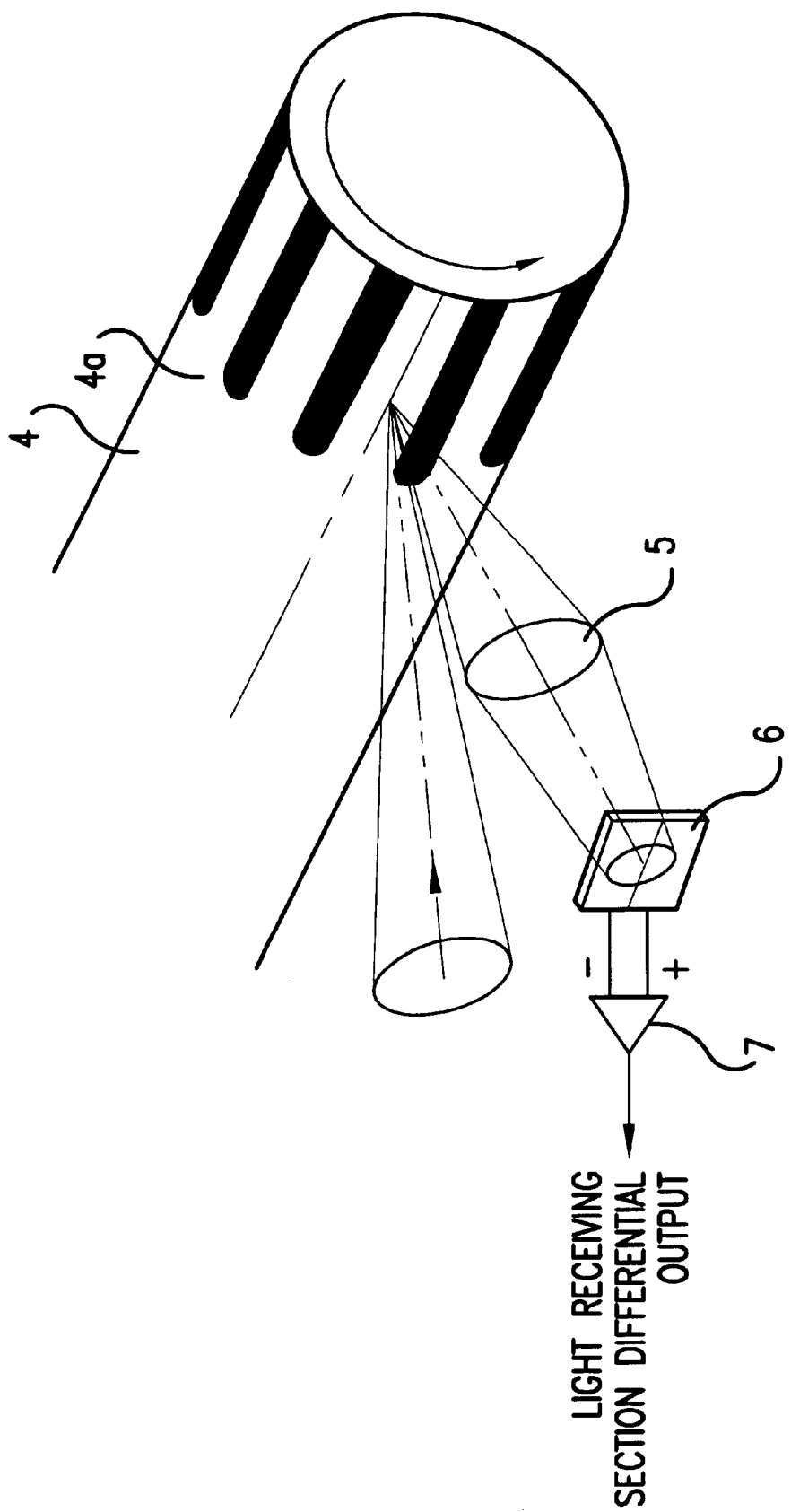
FIG. 3 is a perspective view showing the convergent state of laser beams in the laser beam optical system equivalent to the first embodiment of the present invention.
Figure 4:
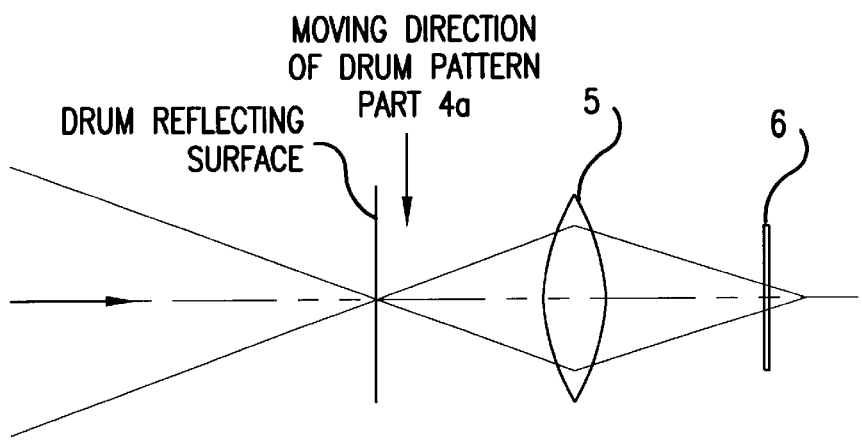
FIG. 4 is a sectional view showing a state in which laser beams focused as shown in FIG. 3 are extended along an optical axis.

As shown in FIGS. 3 and 4, the condensing lens 5 is provided to efficiently lead a laser beam reflected from the photoconductive drum 4 to the light receiving section 6 and is not required if the light receiving section 6 is arranged sufficiently close to the photoconductive drum 4 or is provided with size enough to receive a reflected laser beam. The light receiving section 6 is arranged in the vicinity of the focus of a laser beam reflected from the condensing lens 5, however, it is desirable that the light receiving section is arranged so that the focus by the condensing lens 5 of a laser beam is always located on the front side or the rear side of the light receiving section 6 without depending upon the focusing condition to enable stable detection because the present invention is made to detect the occulting variation of a laser beam influenced by the bright and dark banded pattern in the drum pattern part 4a.

In the above description, the light receiving section 6 shall be arranged so that a reflected laser beam from the photoconductive drum 4 is focused on the rear side of the light receiving section 6 independent of a convergent state on the surface of the photoconductive drum 4, that is, whether a laser beam is focused on the front side of the surface of the photoconductive drum 4 (hereinafter called a state focused on the front side) or a laser beam is focused on the rear side of the surface of the photoconductive drum 4 (hereinafter driving circuit 11.

The light receiving section 6 is divided into two light receiving areas provided with a boundary line approximately in the direction of the rotation axis of the photoconductive drum 4 (hereinafter called a horizontal scanning direction).

Figure 2B:
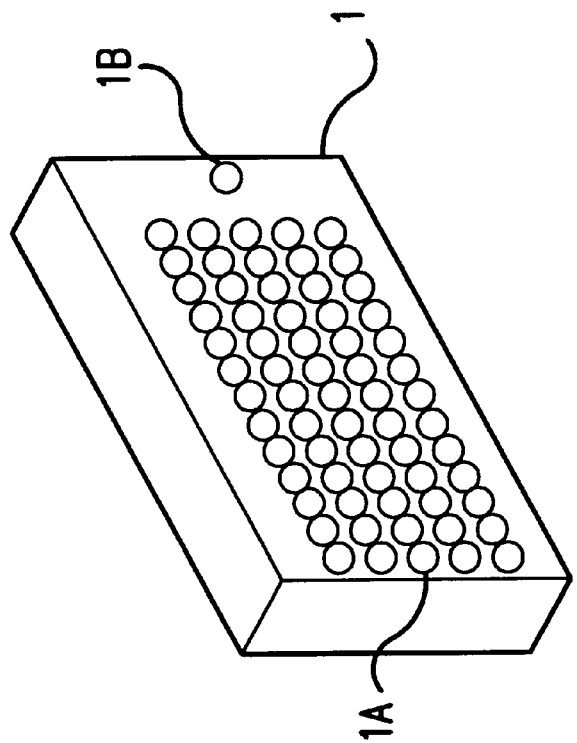
FIGS. 2(a)–2(b) are a perspective view showing a semiconductor laser array used for the laser beam optical system equivalent to the first embodiment of the present invention.
Figure 2A:
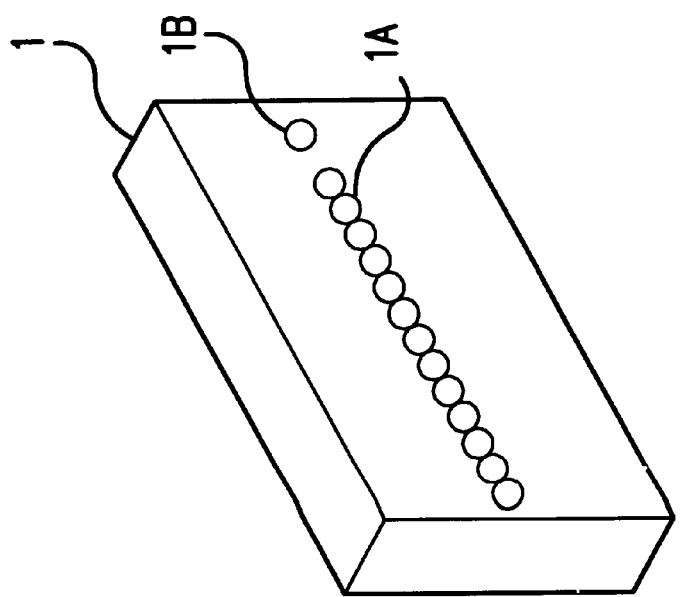

Next, referring to FIG. 2, the semiconductor laser array 1 used for the laser beam optical system equivalent to this embodiment will be described. FIG. 2 (a) shows an example of the semiconductor laser array 1. This semiconductor laser array 1 is provided with plural laser beam emitting elements 1A for radiating a laser beam according to image information in a horizontal scanning direction and a laser beam emitting element 1B arranged next to the laser beam emitting element 1A for radiating a laser beam for detection for detecting the focal dislocation of a laser beam.

FIG. 2 (b) shows another example of the semiconductor laser array 1. This semiconductor laser array 1 is provided with plural laser beam emitting elements 1A for two-dimensionally radiating a laser beam according to image information on the photoconductive drum 4 and a laser beam emitting element 1B arranged next to the laser beam emitting element 1A for radiating a laser beam for detection for detecting the focal dislocation of a laser beam.

The laser beam emitting element 1B has predetermined positional relationship with the adjacent plural laser beam emitting elements 1A and is provided with the same output characteristic. For lighting timing, a laser beam for detection may be radiated in synchronization with timing in which a laser beam according to image information is radiated from the plural laser beam emitting elements 1A, the laser beam emitting element 1B may be also lit when focal dislocation is corrected or may be also always lit.

Next, referring to FIGS. 3 to 18, a focusing method for correcting focal dislocation using the laser beam optical system equivalent to this embodiment will be described.

Figure 5:
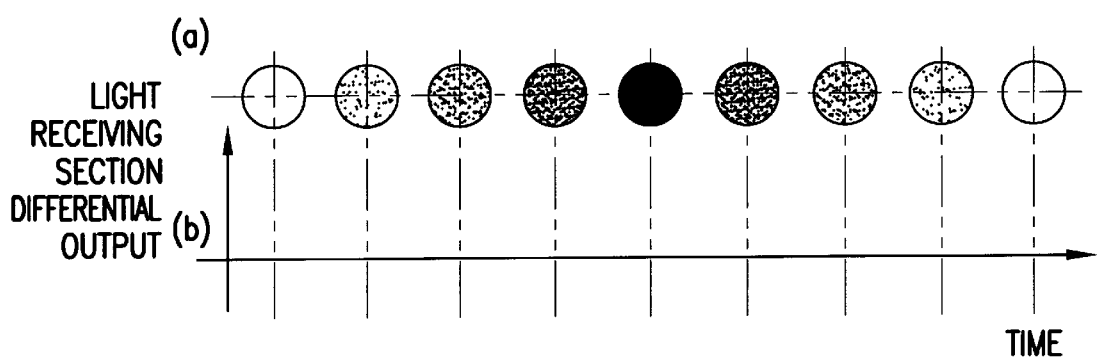
FIGS. 5(a)–5(b) show the occulting light of a laser beam on a light receiving section in the laser beam optical system equivalent to the first embodiment of the present invention and light receiving section differential output.
Figure 6:
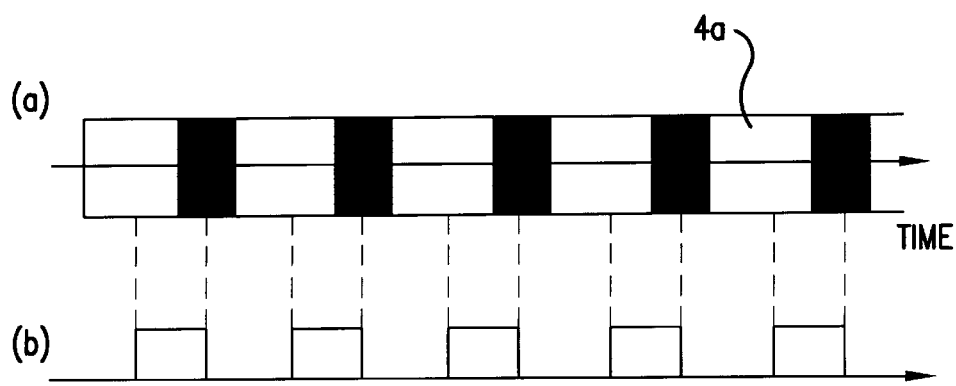
FIGS. 6(a)–6(b) show the time change of a drum pattern part 4a in the laser beam optical system equivalent to the first embodiment of the present invention according to the rotation of a photoconductive drum 4 and a drum pattern synchronizing signal generated in synchronization with the time change.

FIG. 3 is a perspective view showing a state in which a laser beam outgoing from the laser beam emitting element 1B is focused on the surface of the photoconductive drum 4, is reflected approximately in a predetermined direction and the reflected laser beam is focused on the light receiving surface of the light receiving section 6 through the condensing lens 5. FIG. 4 is a sectional view showing light beams extended along an optical axis in an optical path shown in FIG. 3. FIG. 5 shows the time change shown in FIG. 5 (a) of the quantity of light of a light spot of a laser beam on the light receiving surface of the light receiving section 6 and the time change shown in FIG. 5 (b) of differential output corresponding to the above quantity of light from the light receiving section 6. FIG. 6 (a) shows the time change of the bright and dark banded pattern in the drum pattern part 4a according to the rotation of the photoconductive drum 4 and FIG. 6 (b) shows a drum pattern synchronizing signal synchronized with the time change of the bright and dark banded pattern and output from the drum pattern synchronizing signal generating circuit 8 and called a state focused on the rear side).

As shown in FIG. 6, it is desirable to facilitate later signal processing that the cycle of a drum pattern synchronizing signal is equal to that of the bright and dark banded pattern in the drum pattern part 4a and the edge on the rear side of a drum pattern synchronizing signal is equal to the center of the dark banded pattern in the drum pattern part 4a. A drum pattern synchronizing signal may correspond to a reverse pattern to the above bright and dark banded pattern.

Figure 7:
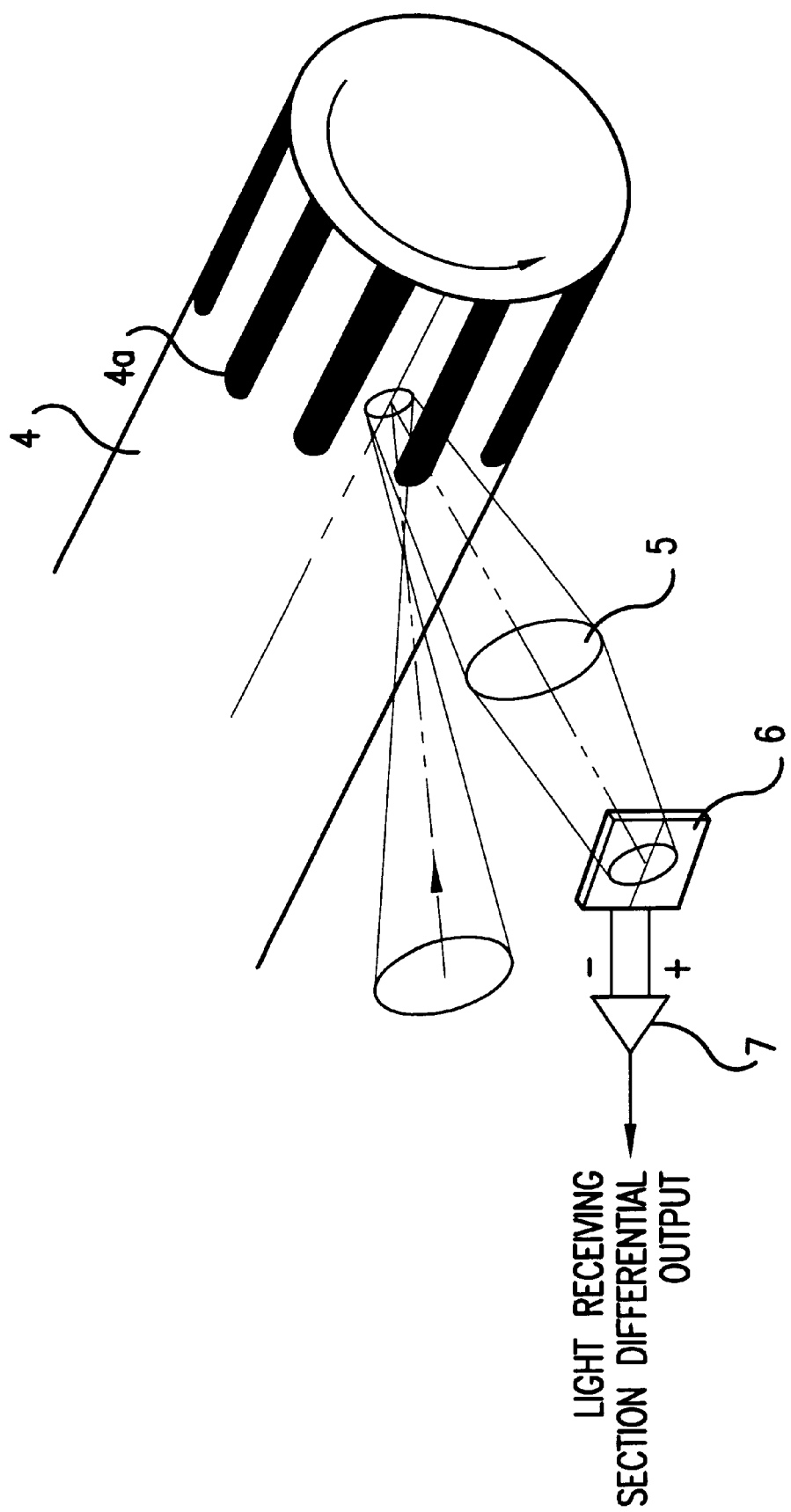
FIG. 7 is a perspective view showing the convergent state of laser beams in case laser beams are focused on the front side in the laser beam optical system equivalent to the first embodiment of the present invention.
Figure 8:
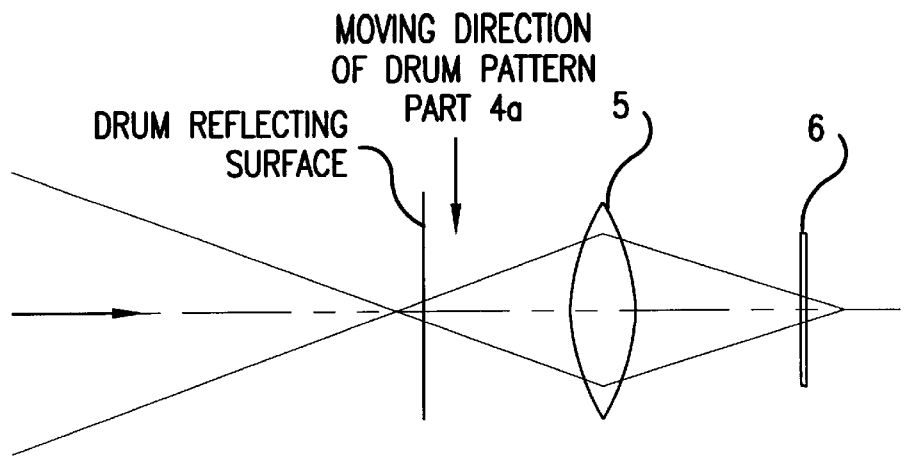
FIG. 8 is a sectional view showing a state in which laser beams converged as shown in FIG. 7 are extended along an optical axis.
Figure 9:
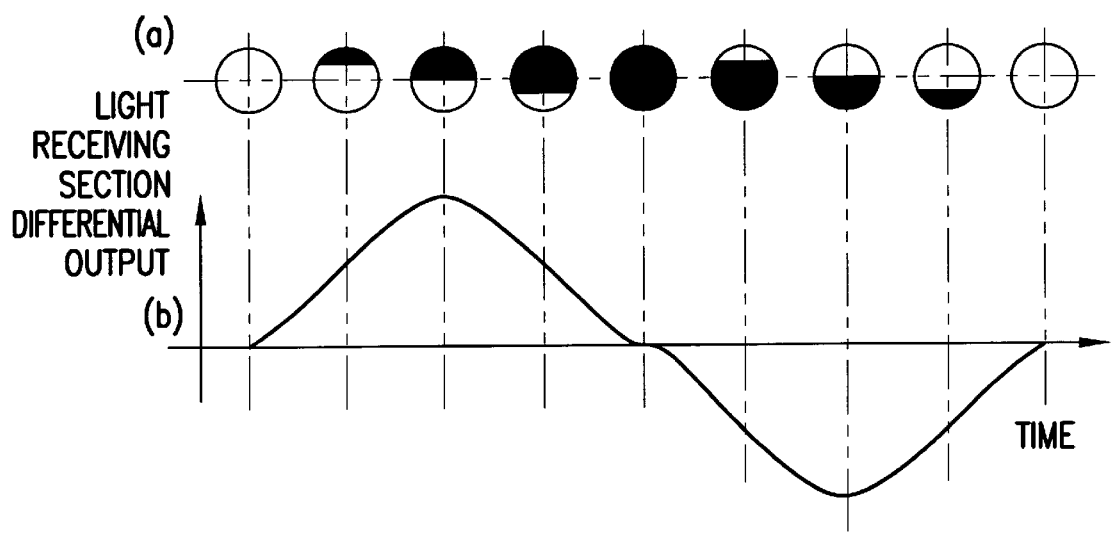
FIGS. 9(a)–9(b) show the time change of the occulting light on a light receiving section 6 of a laser beam when the drum pattern part 4a crosses the laser beam on the surface of the photoconductive drum 4 and the time change of light receiving section differential output acquired based upon the output of the light receiving section 6 at this time in a differential circuit 7.

FIG. 7 is a perspective view showing that a laser beam outgoing from the laser beam emitting element 1B is focused in a state focused on the front side, that is, on the front side of the surface of the photoconductive drum 4, is reflected approximately in a predetermined direction and the reflected laser beam is focused on the light receiving surface of the light receiving section 6 by the condensing lens 5. FIG. 8 is a sectional view showing light beams extended along an optical axis in an optical path shown in FIG. 7. FIG. 9 (a) shows the time change in the bright and dark conditions of light on the light receiving section 6 of a laser beam when the drum pattern part 4a crosses a laser beam converged on the surface of the photoconductive drum 4 and FIG. 9 (b) shows the time change of the light receiving section differential output acquired in the differential circuit 7 based upon the state of the light receiving section 6 at this time. The above time change means time change in a period of a pulse of a drum pattern synchronizing signal 1 shown in FIG. 6.

Figure 10:
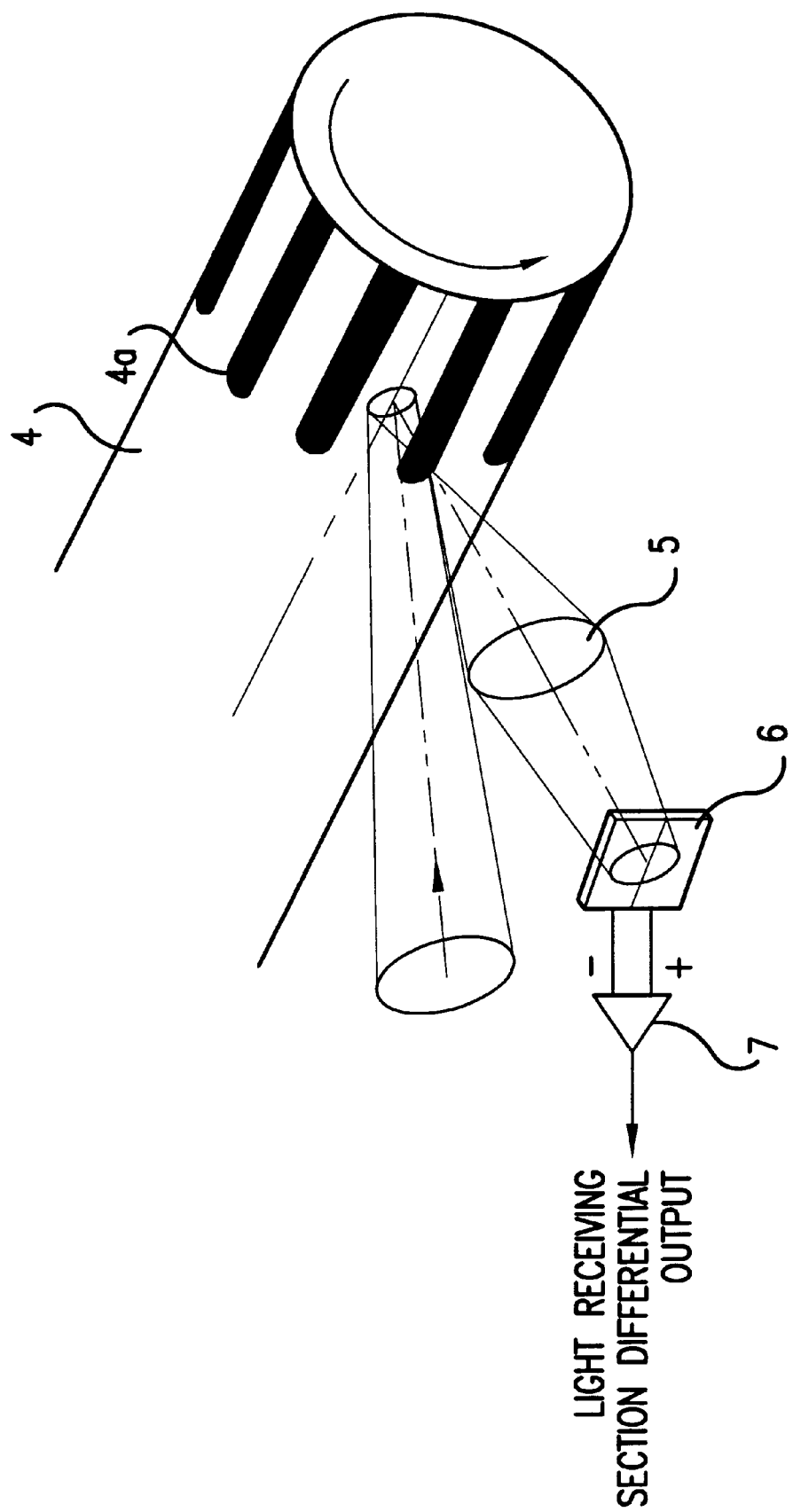
FIG. 10 is a perspective view showing the convergent state of laser beams in case laser beams are focused on the rear side in the laser beam optical system equivalent to the first embodiment of the present invention.
Figure 11:
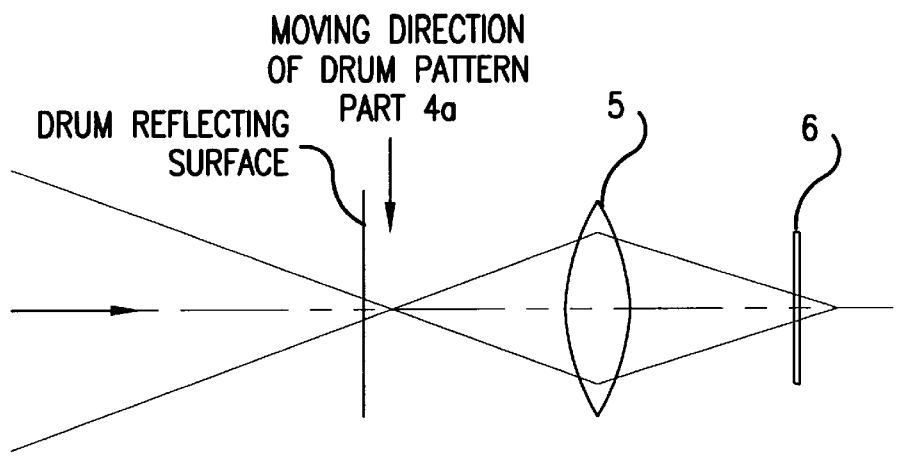
FIG. 11 is a sectional view showing a state in which laser beams converted as shown in FIG. 10 are extended along an optical axis.

FIG. 10 is a perspective view showing that a laser beam outgoing from the laser beam emitting element 1B is in a state focused on the rear side, that is, focused on the rear side of the surface of the photoconductive drum 4, reflected approximately in a predetermined direction and the reflected laser beam is focused on the light receiving surface of the light receiving section 6 by the condensing lens 5. FIG. 11 is a sectional view showing light beams extended along an optical axis in an optical path shown in FIG. 10, FIG. 12 (a) shows the time change of the bright and dark conditions of light on the light receiving section 6 of a laser beam when the drum pattern part 4a crosses a laser beam converged on the surface of the photoconductive drum 4 and FIG. 12 (b) shows the time change of the light receiving section differential output acquired in the differential circuit 7 based up on the state of the light receiving section 6 at this time. The above time change means time change in a period of a pulse of a drum pattern synchronizing signal 1 shown in FIG. 6.

Referring to the above described drawings, the operation of the laser beam optical system equivalent to this embodiment will be described below. FIGS. 3 to 6 show a case in which a laser beam is focused on the surface of the photoconductive drum 4 and as the change of occulting light in a light spot on the light receiving surface of the light receiving section 6 at this time is blinked as the whole light spot as shown in FIG. 5 (a), the differential output of the light receiving section 6 is always zero as shown in FIG. 5 (b).

Next, as shown in FIGS. 7 to 9, a case in which a convergent state on the surface of the photoconductive drum 4 is a state in which a laser beam is focused on the front side will be described. If a convergent state on the photoconductive drum 4 shown in FIGS. 7 and 8 is a state in which a laser beam is focused on the front side, a laser beam spot on the photoconductive drum 4 is darkened from the top in a period of a pulse of a drum pattern synchronizing signal 1 when the bright and dark banded pattern in the drum pattern part 4a on the photoconductive drum 4 crosses a laser beam, the dark part sequentially covers the whole laser beam spot and after a dark part in the bright and dark banded pattern in the drum pattern part 4a passes through the laser beam, the laser beam spot on the photoconductive drum 4 is brightened from the top.

At this time, as shown in FIG. 8, the top of a laser beam spot on the reflection surface of the drum corresponds to that of the light receiving section 6. The spot of a laser beam received on the light receiving surface of the light receiving section 6 shown in FIG. 9 (a) is therefore darkened from the top, the dark part sequentially covers the whole laser beam spot on the light receiving surface of the light receiving section 6 and after a dark part in the bright and dark pattern in the drum pattern part 4a passes through the laser beam, the laser beam spot on the light receiving surface of the light receiving section 6 is brightened from the top. At this time, as shown in FIG. 9 (b), the light receiving section differential output from the differential circuit 7 based upon output from the light receiving section 6 approximates to output in the form of a sinusoidal wave which changes from a positive value to a negative value.

Figure 12:
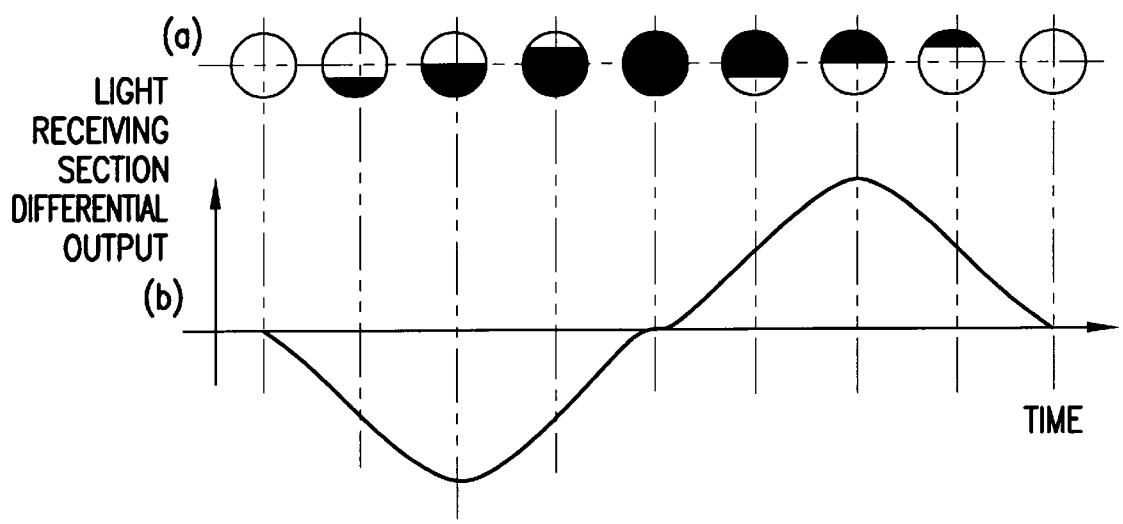
FIGS. 12(a)–12(b) show the time change of the occulting light on the light receiving section 6 of a laser beam when the drum pattern part 4a crosses the laser beam on the surface of the photoconductive drum 4 and the time change of light receiving section differential output acquired based upon the output of the light receiving section 6 at this time in the differential circuit 7.

Next, referring to FIGS. 10 to 12, a case in which a convergent state on the photoconductive drum 4 is a state in which a laser beam is focused on the rear side will be described. As shown in FIGS. 10 and 11, if a convergent state on the photoconductive drum 4 is a state in which a laser beam is focused on the rear side, a laser beam spot on the photoconductive drum 4 is darkened from the top in a period of a pulse of a drum pattern synchronizing signal 1 when the bright and dark pattern in the drum pattern part 4a on the photoconductive drum 4 crosses the laser beam, the dark part sequentially covers the whole laser beam spot and after the dark part in the bright and dark pattern in the drum pattern part 4a passes through the laser beam spot, the laser beam spot on the photoconductive drum 4 is brightened from the top.

At this time, as shown in FIG. 11, the top of the laser beam spot on the reflection surface of the drum corresponds to the lower side of the light receiving section 6. The spot of a laser beam received on the light receiving surface of the light receiving section 6 shown in FIG. 12 (a) is therefore darkened from the bottom, the dark part sequentially covers the whole laser beam spot on the light receiving surface of the light receiving section 6 and after a dark part in the bright and dark banded pattern in the drum pattern part 4a passes through the laser beam, the laser beam spot on the light receiving surface of the light receiving section 6 is brightened from the bottom. At this time, as shown in FIG. 12 (b), the light receiving section differential output from the differential circuit 7 based upon output from the light receiving section 6 approximates to output in the form of a sinusoidal wave which changes from a negative value to a positive value.

As described above, depending upon whether a convergent state on the photoconductive drum 4 is a state in which a laser beam is focused on the front side or the rear side, the change of the polarity of a value output from the differential circuit 7 is different. The change of polarity may be reverse to the above change of the polarity depending upon a drum pattern synchronizing signal, a position in which the light receiving section 6 is arranged or a method of operation by the differential circuit 7, however, it is similar that a state in which a laser beam is focused on the front side is reverse in the change of polarity to a state in which a laser beam is focused on the rear side.

Next, referring to FIG. 13, the details of the arithmetic circuit 9 for generating a signal to be input to the hold circuit 10 for generating an automatic focus control signal based upon output from the differential circuit 7 and the drum pattern synchronizing signal generating circuit 8 and referring to FIGS. 14 and 15, a signal generated by each constituting circuit of the arithmetic circuit 9 will be described.

Figure 13:
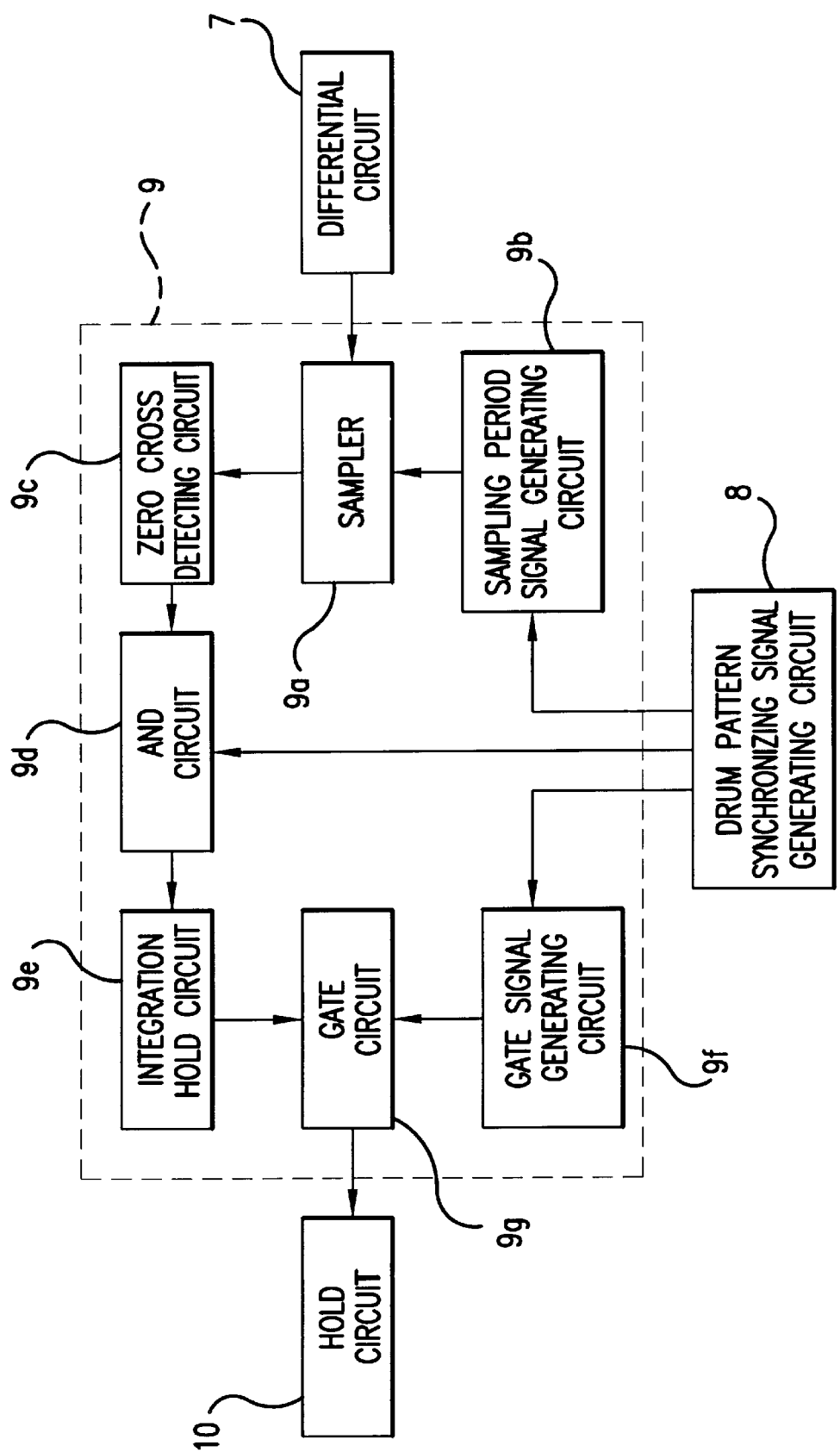
FIG. 13 is a block diagram showing the constitution of an arithmetic circuit 9 in the laser beam optical system equivalent to the first embodiment of the present invention.

As shown in FIG. 13, the differential circuit 7 operates and outputs difference between each output of each light receiving section into which the light receiving section 6 is divided, in the concrete, is constituted by an operational amplifier and others and the light receiving section differential output from the differential circuit 7 is input to a sampler 9a. The light receiving section differential output from the differential circuit 7 is output approximating to a sinusoidal wave the change of the polarity of which is reverse in the convergent states on the photoconductive drum 4 respectively described referring to FIGS. 9 and 12, that is, a state in which a laser beam is focused on the front side and a state in which a laser beam is focused on the rear side and is a signal string shown in FIG. 14 (c).

The drum pattern synchronizing signal generating circuit 8 is a circuit for generating a signal in a predetermined cycle in synchronization with the rotation of the photoconductive drum 4. In the concrete, the above circuit is a circuit for outputting a signal from a rotary encoder and others installed on a motor shaft for rotating the photoconductive drum 4 and others or a circuit for detecting a bright and dark banded pattern and others in the drum pattern part 4a on the photoconductive drum 4 and outputting a signal in synchronization with the bright and dark banded pattern and others. As shown in FIG. 6, the cycle is equal to the cycle of the bright and dark banded pattern in the drum pattern part 4a on the photoconductive drum 4, the edge on the rear side of a drum pattern synchronizing signal is equivalent to a dark part in the bright and dark banded pattern in the drum pattern part 4a and a signal output from the drum pattern synchronizing signal generating circuit 8 is a signal string shown in FIG. 14 (a).

Figure 14:
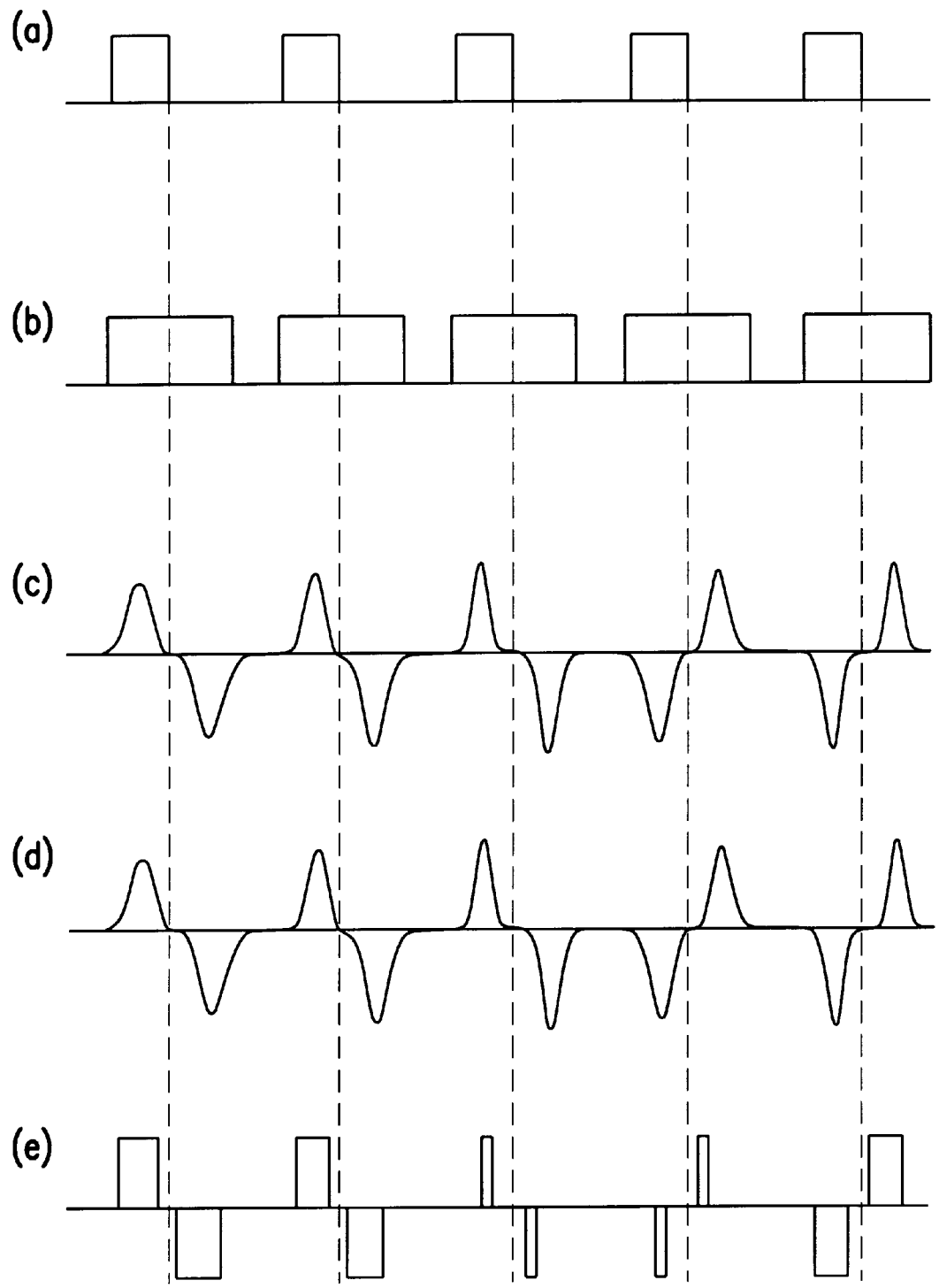
FIGS. 14(a)–14(e) show a drum pattern synchronizing signal (a), a sampling period signal (b), a light receiving section differential output signal (c), a sampling signal (d) and a zero cross signal (e) acquired by the laser beam optical system equivalent to the first embodiment of the present invention.

The sampler 9a is a circuit for sampling the light receiving section differential output from the differential circuit 7 in synchronization with a drum pattern synchronizing signal output from the drum pattern synchronizing signal generating circuit 8 and a sampling pulse output from the sampler 9a is a signal string shown in FIG. 14 (d). Although a light receiving section differential signal shown in FIGS. 14 (c) and 14 (d) and a sampling pulse have the same waveform, they are different in that no sampling pulse is output in except a sampling period, that is, a sampling pulse is zero.

A sampling period signal generating circuit 9b is a circuit for generating a signal for setting a sampling period for sampling output from the differential circuit 7 in the sampler 9a in a predetermined period based upon output from the drum pattern synchronizing signal generating circuit 8. The above signal includes a bright part and a dark part in the bright and dark banded pattern in the drum pattern part 4a as shown in FIG. 6 and is generated for a period in which a convergent state on the photoconductive drum 4 can be detected in the form of the change of the polarity of an output value from the light receiving section 6. A signal output from the sampling period signal generating circuit 9b is a signal string shown in FIG. 14 (b).

A zero cross detecting circuit 9c is a circuit for generating a pulse in a period in which a signal output from the sampler 9a is approximately at a zero level. In the concrete, the above circuit generates a pulse in a period in which a signal output from the sampler 9a is separated into positive and negative parts and is approximately at a zero level and again synthesizes the separated parts and a signal output from the zero cross detecting circuit 9c is a signal string shown in FIG. 14 (e).

AND circuit 9d is a circuit for extracting a first pulse in each sampling period from an output signal string from the zero cross detecting circuit 9c. In the concrete, an output signal from the drum pattern synchronizing signal generating circuit 8 and an output signal from the zero cross detecting circuit 9c are ANDed and an output signal from the AND circuit 9d is a signal string shown in FIG. 15 (a).

An integration hold circuit 9e is a circuit for integrating an output signal from the AND circuit 9d. In the concrete, the integration hold circuit includes a circuit for resetting to zero at the trailing edge of an output signal from the drum pattern synchronizing signal generating circuit 8 together with the circuit for integration and an output signal from the integration hold circuit 9e is a signal string shown in FIG. 15 (b).

A gate signal generating circuit 9f is a circuit for generating a gate signal for extracting the last integrated value in each sampling period of an output signal from the integration hold circuit 9e in a gate circuit 9g. In the concrete, a gate signal is generated based upon the edge on the rear side of an output signal from the AND circuit 9d and the edge on the rear side of an output signal from the drum pattern synchronizing signal generating circuit 8 and an output signal from the gate signal generating circuit 9f is a signal string shown in FIG. 15 (c).

The gate circuit 9g is a circuit for extracting the last integrated value in each sampling period of an output signal from the integration hold circuit 9e based upon an output signal from the gate signal generating circuit 9f. An output signal from the gate circuit 9g is a signal string shown in FIG. 15 (d).

The hold circuit 10 is a circuit for smoothing an output signal acquired in the gate circuit 9g according to an output signal acquired in the gate circuit 9g, that is, a pulse signal string showing a convergent state on the photoconductive drum 4 so as to drive the focusing actuator 12 via the focusing lens driving circuit 11 and enable focusing. In the concrete, the hold circuit includes a circuit for resetting to zero at the leading edge of an output signal from the gate circuit 9g together with the circuit for holding an output signal from the gate circuit 9g. An output signal from the hold circuit 10 is continuous ringing shown in FIG. 15 (e).

Next, focusing operation based upon the above acquired continuous ringing will be described. First, assuming that a convergent state on the photoconductive drum 4 is a state in which a laser beam is focused on the front side when focusing operation is started, it will be described how focusing operation is executed according to the elapse of time since focusing operation is started. If a convergent state on the photoconductive drum 4 is a state in which a laser beam is focused on the front side when focusing operation is started, the output of the differential circuit 7 based upon output from the light receiving section 6 is output approximating to a sinusoidal wave which changes from a positive value to a negative value as shown in FIG. 9 (b) as described above referring to FIG. 9 and the output of the hold circuit 10 generated based upon the output in the form of the sinusoidal wave via the arithmetic circuit 9 is a positive value as shown in FIG. 15 (e). The output of the above hold circuit 10 is input to the focusing lens driving circuit 11, drives the focusing actuator 12 and moves the focusing lens 3 in a direction toward a focus on the rear side.

In the next sampling period, a convergent state on the photoconductive drum 4 is a state in which a laser beam is focused on the front side, however, a convergent state on the photoconductive drum 4 approximates a focused state, compared with when focusing operation is started. In the further next sampling period, a convergent state on the photoconductive drum more approximates a focused state. As time elapses, a convergent state on the photoconductive drum more approximates a focused state, reaches a focused state at a time or proceeds to a state in which a laser beam is focused on the rear side. If a convergent state on the photoconductive drum is a state in which a laser beam is focused on the rear side, as described above referring to FIG. 12, the output of the differential circuit 7 based upon output from the light receiving section 6 is output approximating to a sinusoidal wave which changes from a negative value to a positive value as shown in FIG. 12 (b), the output of the hold circuit 10 generated based upon the output via the arithmetic circuit 9 is a negative value as shown in FIG. 15 (e), the focusing actuator 12 executes operation reverse to the above operation, a convergent state on the photoconductive drum approximates a focused state again and reaches a focused state at a time. The above series of operation is so-called sampling servo control based upon the cycle of the bright and dark banded pattern in the drum pattern part 4a, however, it more approximates continuous servo control by setting the cycle of the bright and dark banded pattern in the drum pattern part 4a to a small value and smooth focusing operation is enabled.

Next, referring to FIGS. 16 to 18, a case in which the output of the differential circuit 7 is deteriorated as a whole because toner for forming an image and others adhere to the photoconductive drum and others or the position of the light receiving section is varied due to temperature and others and a case in which the output of the differential circuit 7 is asymmetrical will be described.

Figure 15:
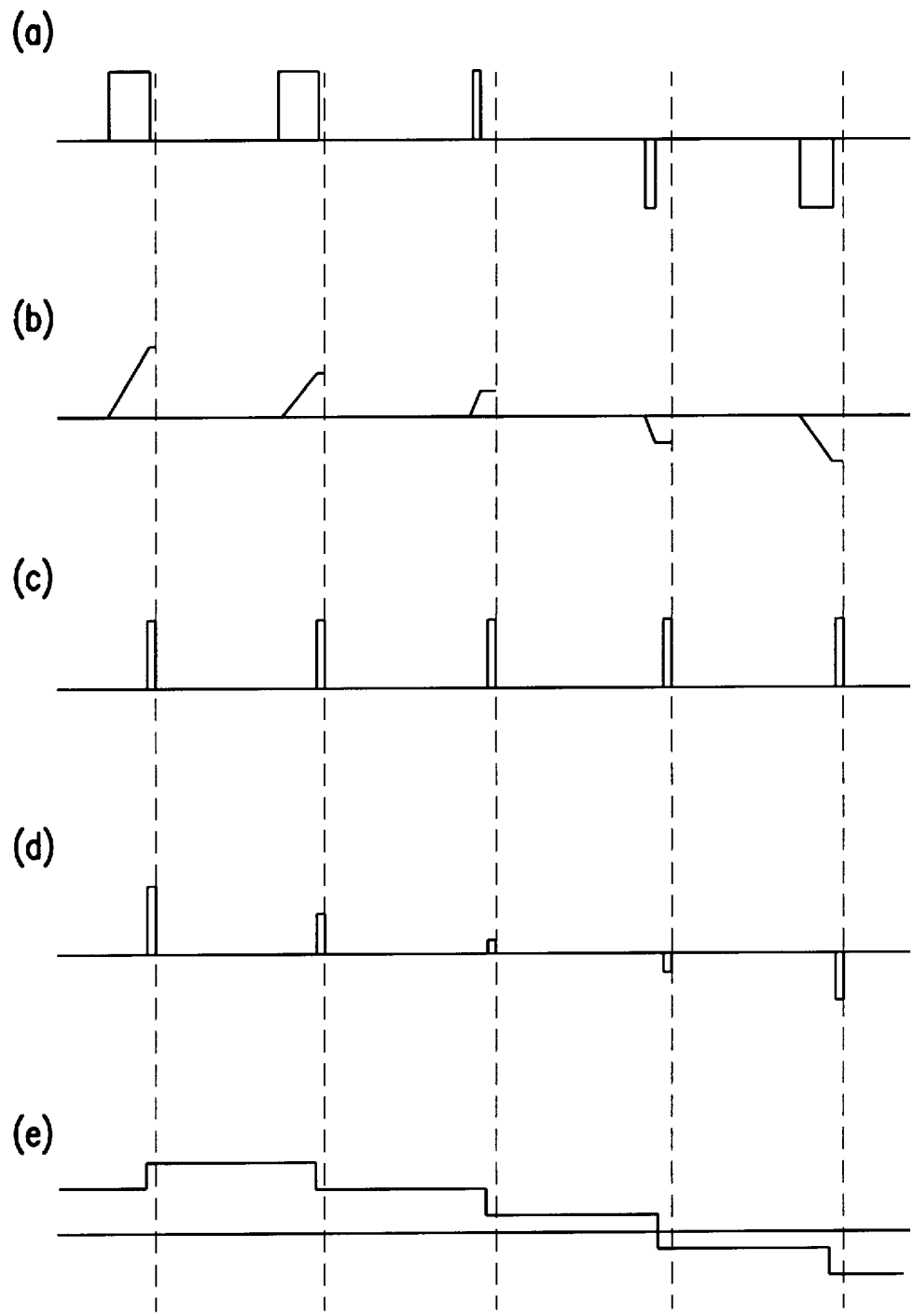
FIGS. 15(a)–15(e) show an AND output signal (a), an integration hold signal (b), a gate signal (c), an output signal (d) and a control signal (e) acquired by the laser beam optical system equivalent to the first embodiment of the present invention.
Figure 16:
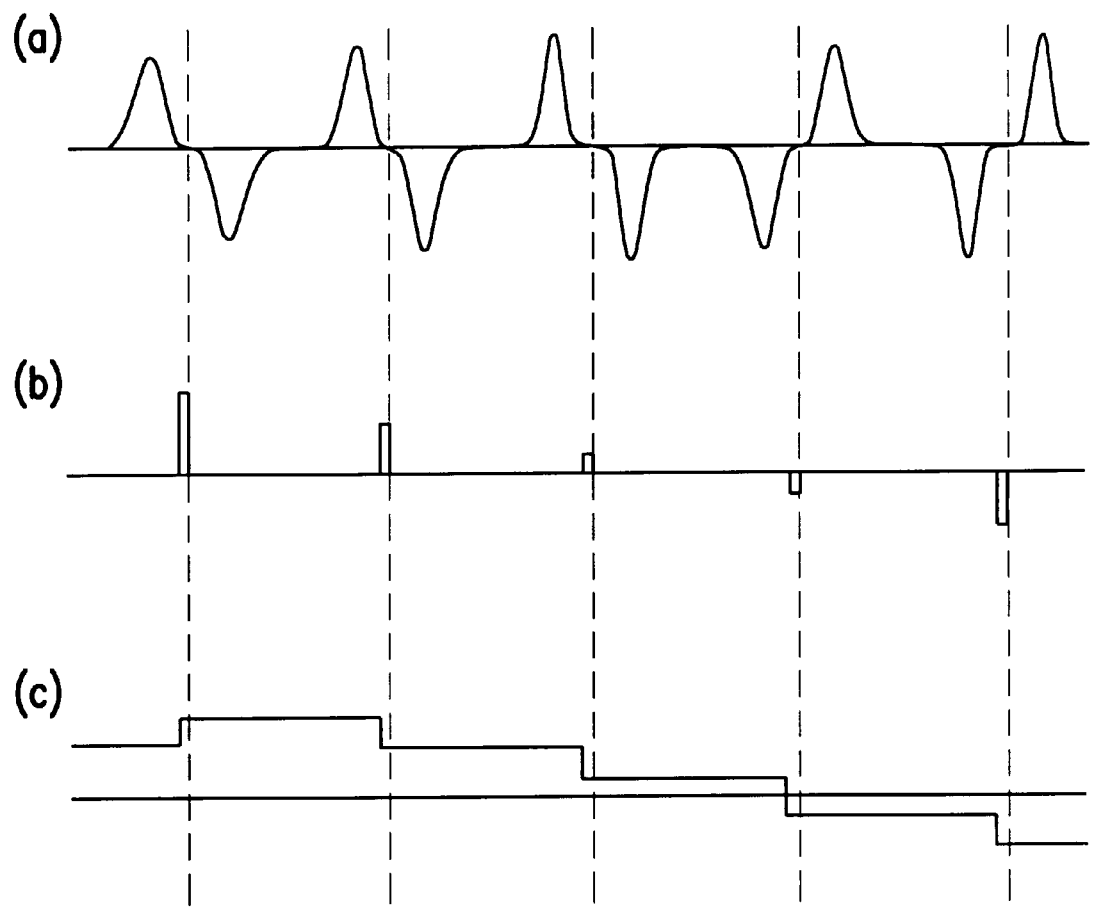
FIGS. 16(a)–16(c) show a light receiving section differential output signal, an output signal and a control signal in case no toner and nothing adhere to a photoconductive drum and others or the position of a light receiving section is not varied due to temperature and others in the laser beam optical system equivalent to the first embodiment of the present invention.

FIGS. 16 (a), (b) and (c) respectively show a light receiving section differential output signal, an output signal and a control signal in case no toner for forming an image and nothing adhere to the photoconductive drum and others or the position of the light receiving section is not varied due to temperature and others and respectively show FIG. 14 (c), FIG. 15 (d) and FIG. 15 (e) again.

Figure 17:
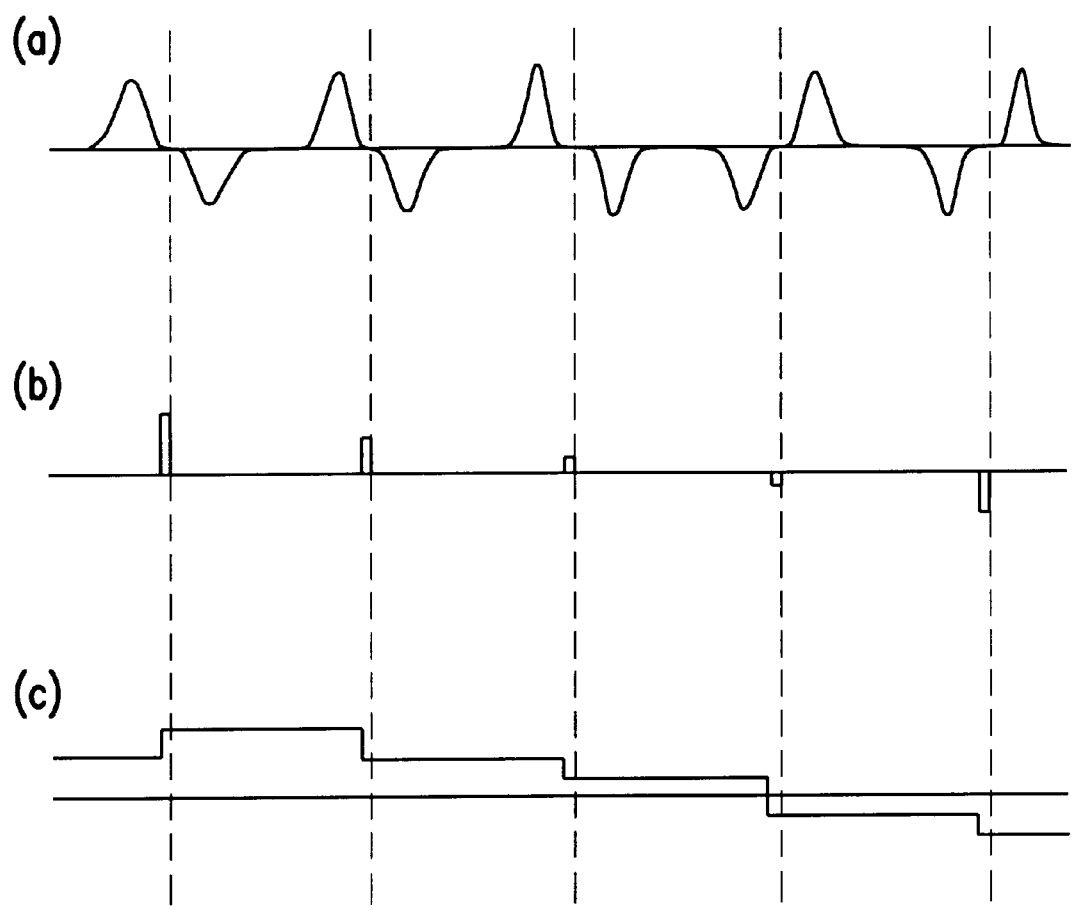
FIGS. 17(a)–17(c) show a light receiving section differential output signal, an output signal and a control signal in case toner and others adhere to a photoconductive drum and others or the position of a light receiving section is varied due to temperature and others in the laser beam optical system equivalent to the first embodiment of the present invention.

In the meantime, FIGS. 17 (a), (b) and (c) respectively show a light receiving section differential output signal, an output signal and a control signal in case the output of the differential circuit 7 is deteriorated as a whole because toner for forming an image and others adhere to the photoconductive drum and others or the position of the light receiving section is varied due to temperature and others. The signal level of the light receiving section differential output signal shown in FIG. 17 (a) is deteriorated as a whole and accordingly, the respective signal levels of the output signal shown in FIG. 17 (b) and the control signal shown in FIG. 17 (c) are also deteriorated as a whole, however, though gain by focusing control is a little deteriorated, the above focusing operation is sufficiently enabled and as a point which crosses a zero level is unchanged, high precision focusing operation can be maintained. If a control signal shown in FIG. 17 (c) is at a higher level than the level of noise even if a signal level is deteriorated as described above, the above focusing operation is enabled.

Figure 18:
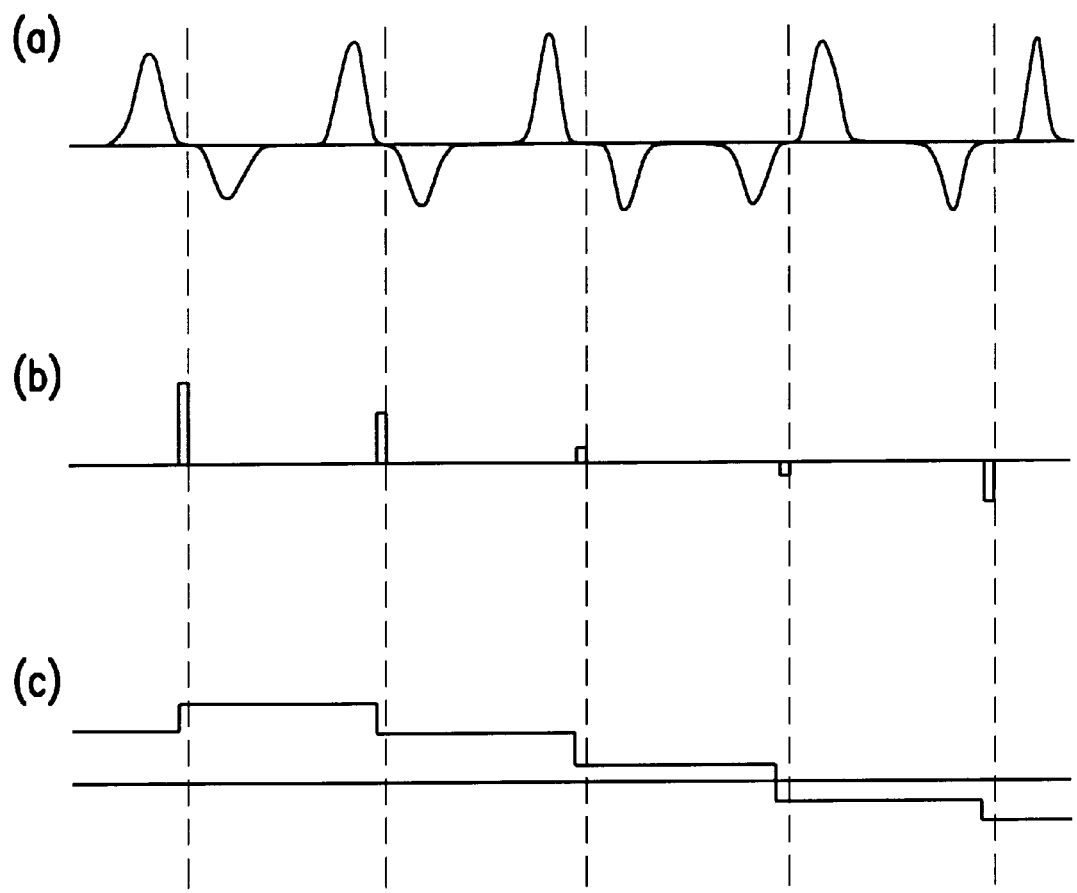
FIGS. 18(a)–18(c) show a light receiving section differential output signal, an output signal and a control signal in case toner and others adhere to a photoconductive drum and others or the position of a light receiving section is varied due to temperature and others in the laser beam optical system equivalent to the first embodiment of the present invention.

FIGS. 18 (a), (b) and (c) respectively show a light receiving section differential output signal, an output signal and a control signal in case the output of the differential circuit 7 is asymmetrical because toner for forming an image and others adhere to the photoconductive drum and others or the position of the light receiving section is varied due to temperature and others. The light receiving section differential output signal shown in FIG. 18 (a) shows a case in which no pulses on the positive side are influenced, the level of pulses on the negative side is deteriorated and is asymmetrical. At this time, the level of the pulses on the negative side of the output signal shown in FIG. 18 (b) is deteriorated, accordingly, the level of pulses on the negative side of the control signal shown in FIG. 18 (c) is also deteriorated and the control signal is asymmetrical based upon a zero level. In this case, though gain on the negative side of the control signal is a little deteriorated, the above focusing operation is sufficiently enabled and as a point which crosses a zero level is unchanged, high precision focusing operation is maintained. If the control signal shown in FIG. 18 (c) is at a higher level than the level of noise even if the level of pulses on the positive side or on the negative side is deteriorated, the above focusing operation is enabled.

Next, referring to FIGS. 19 to 26, a laser beam optical system equivalent to a second embodiment of the present invention will be described.

Figure 19:
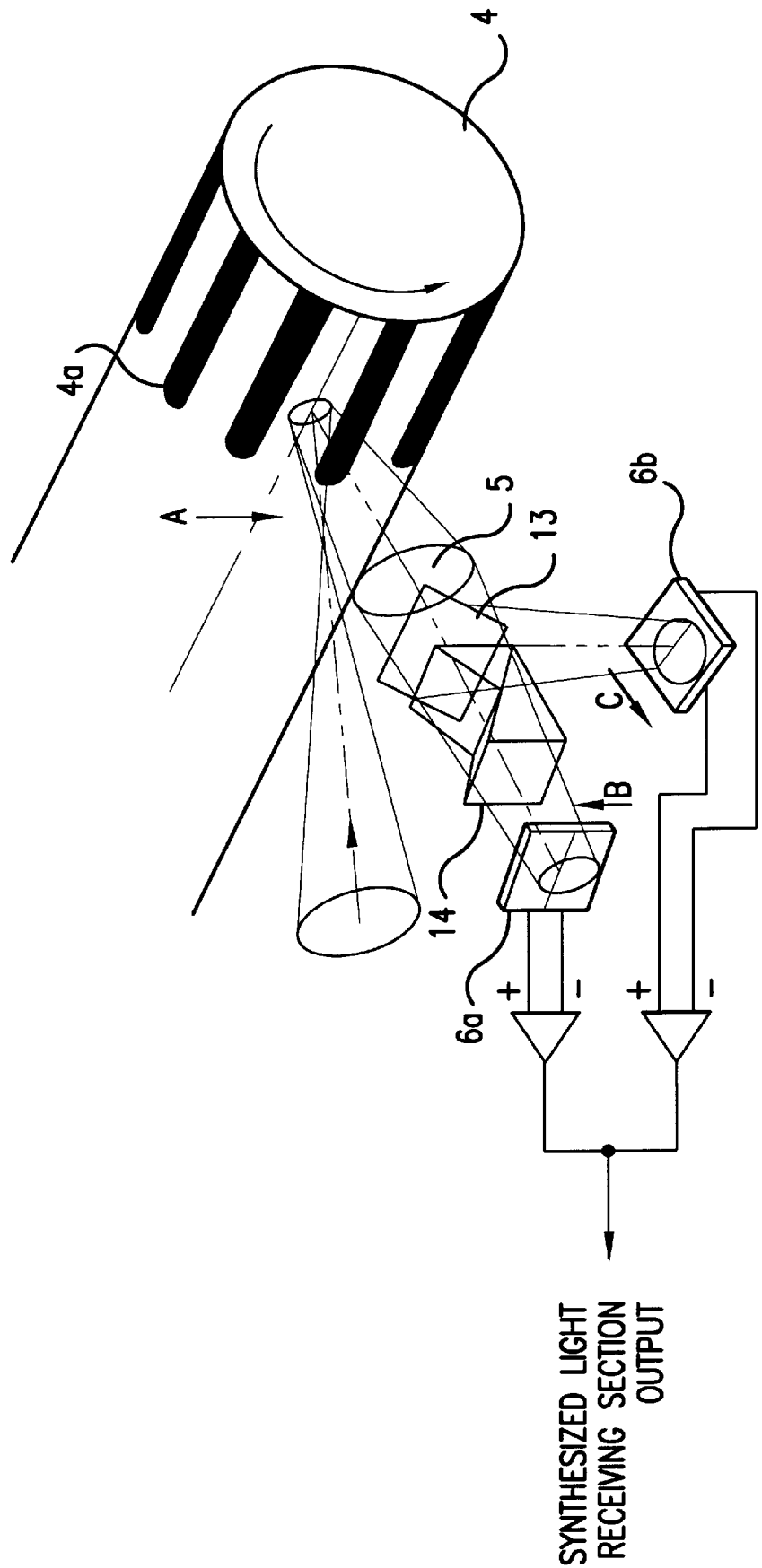
FIG. 19 is a perspective view showing the convergent state of laser beams in case laser beams are focused on the front side in a laser beam optical system equivalent to a second embodiment of the present invention.

FIG. 19 shows an outline of the constitution of the laser beam optical system equivalent to this embodiment. The laser beam optical system equivalent to this embodiment is characterized in that an optical element 13 and an image inverting prism 14 are inserted between the condensing lens 5 and the light receiving section 6 in the laser beam optical system equivalent to the first embodiment and a second light receiving section 6b is provided. The optical element 13 is used for dividing an optical path by reflecting a part of reflected laser beams from a photoconductive drum 4 and transmitting the residual laser beams. The image inverting prism 14 is used for inverting the image of the reflected laser beams. FIG. 19 shows a case in which a convergent state on the photoconductive drum 4 is a state in which a laser beam is focused on the front side. The light receiving section 6a and the light receiving section 6b are respectively arranged in positions separated by equal optical distance from the optical element 13, a laser beam transmitted through the optical element 13 and the image of which is inverted by the image inverting prism 14 is radiated on the light receiving section 6a and a laser beam reflected by the optical element 13 is radiated on the light receiving section 6b. For the optical element 13, a half mirror and a polarizing beam splitter can be given.

Figure 25:
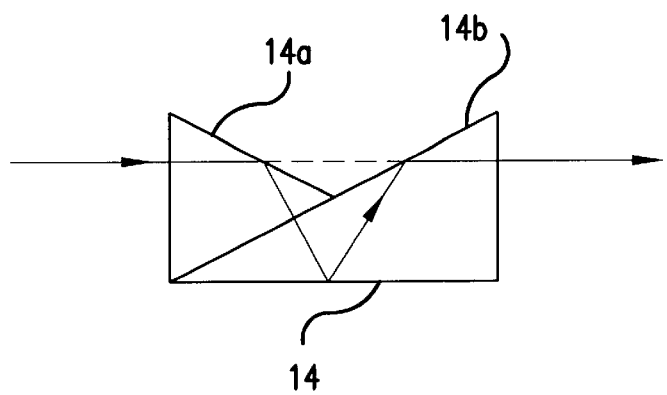
FIG. 25 shows an image inverting prism 14 used in the laser beam optical system equivalent to the second embodiment of the present invention.
Figure 26:
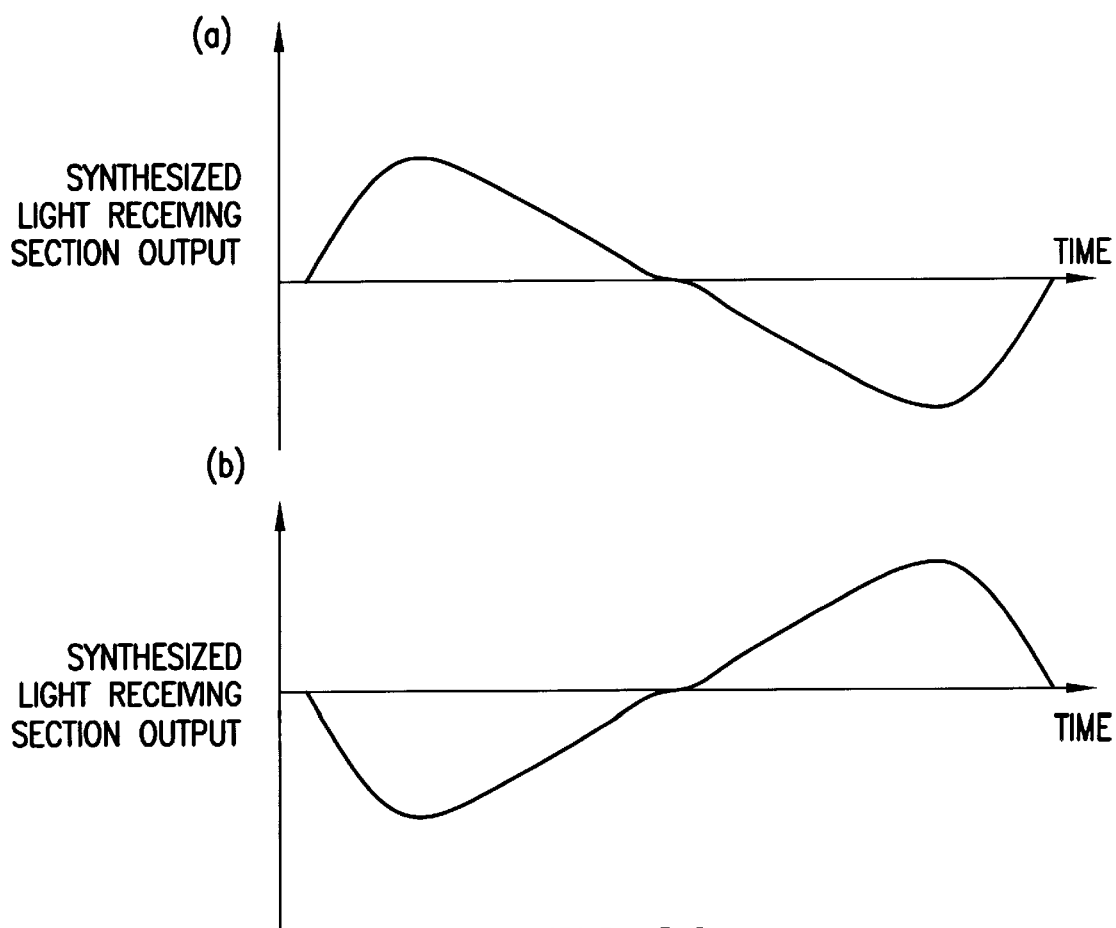
FIGS. 26(a)–26(b) show each synthesized output of a light receiving section in case laser beams are focused on the front side and the rear side in the laser beam optical system equivalent to the second embodiment of the present invention.

For example, the image inverting prism 14 is formed by bonding an equilateral triangular prism 14a shown in FIG. 25 and a rectangular prism 14b the base angle of which is 30 degrees and as an incident angle to the equilateral triangular prism 14a and an outgoing angle from the rectangular prism 14b are a right angle as shown in FIG. 25, an image is also precisely inverted in a focused beam in this embodiment and an optical axis is never dislocated.

In such constitution, if the position or the direction of a laser beam converged on the photoconductive drum 4 or the reflected direction of a laser beam from the photoconductive drum 4 is dislocated in the rotational direction of the photoconductive drum 4, the position of a laser beam radiated on the light receiving section 6a and the light receiving section 6b is also dislocated. When the position of a laser beam is dislocated in the direction of A shown in FIG. 19, a laser beam respectively radiated on the light receiving sections 6a and 6b is respectively dislocated in the directions of B and C. However, in the above constitution, the dislocation of a laser beam respectively in the light receiving sections 6a and 6b is equal.

Figure 20:
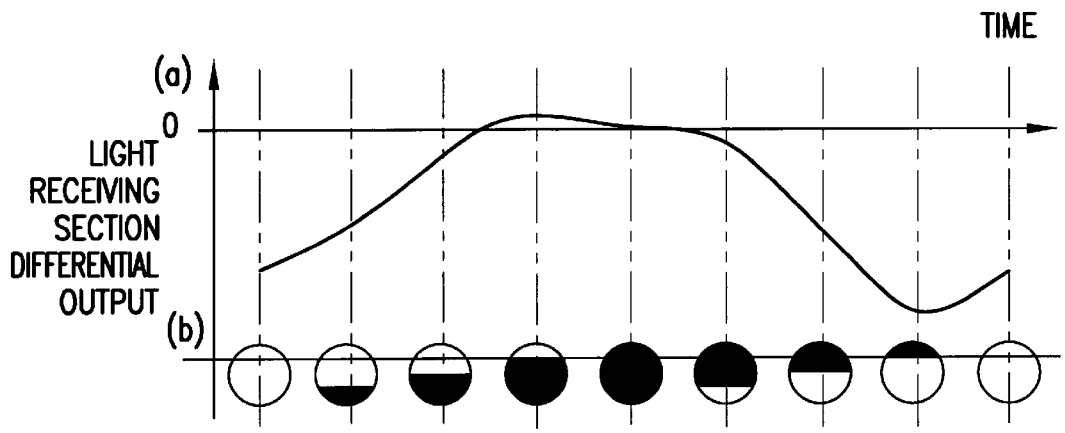
FIGS. 20(a)–20(b) show the time change of the occulting light on a light receiving section 6a of a laser beam when the drum pattern part 4a crosses the laser beam on the surface of the photoconductive drum 4 and light receiving section differential output in case laser beams are focused on the front side in the laser beam optical system equivalent to the second embodiment of the present invention.
Figure 21:
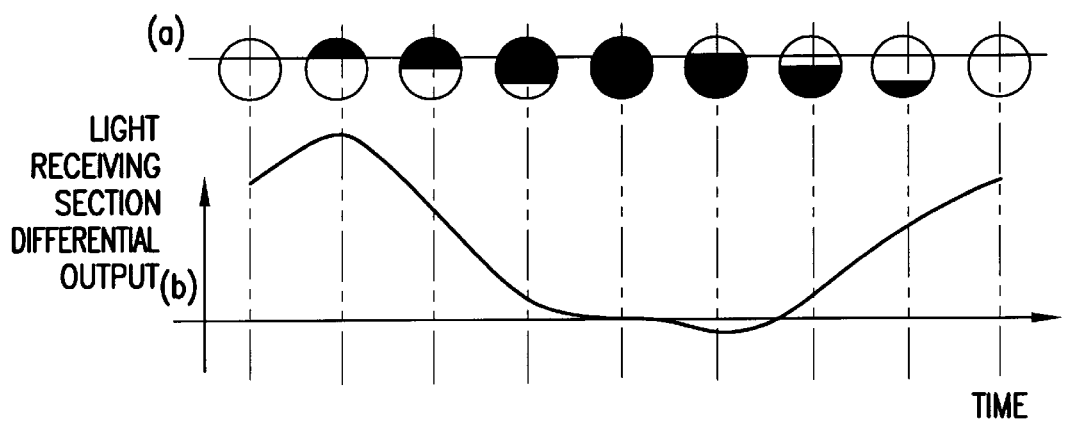
FIGS. 21(a)–21(b) show the time change of the occulting light on a light receiving section 6b of a laser beam when the drum pattern part 4a crosses the laser beam on the surface of the photoconductive drum 4 and light receiving section differential output in case laser beams are focused on the front side in the laser beam optical system equivalent to the second embodiment of the present invention.

FIGS. 20 and 21 show the change of the occulting light of a laser beam on the light receiving surface of the light receiving section 6a or 6b and the differential output of each light receiving section in case a laser beam respectively radiated on the light receiving section 6a and the light receiving section 6b is respectively dislocated in the directions of B and C as described above. FIG. 20 shows that a dark part increases from a side on which the quantity of radiated laser beams is more in one light receiving part of the parts divided into two of the light receiving section 6a, FIG. 21 shows that a dark part increases from a side on which the quantity of radiated laser beams is less in one light receiving part of the parts divided into two of the light receiving section 6b and each light receiving section differential output is an output signal approximating to a sinusoidal wave with an offset. However, synthetic light receiving section output which is the sum of each differential output from the light receiving section 6a and the light receiving section 6b is an output signal without an offset shown in FIG. 26 (a) approximating to a sinusoidal wave as also shown in FIG. 9 (b). This is because the quantity of the dislocation of each laser beam radiated on the light receiving section 6a and the light receiving section 6b is equal and a direction in which a dark part increases is reversed.

Figure 22:
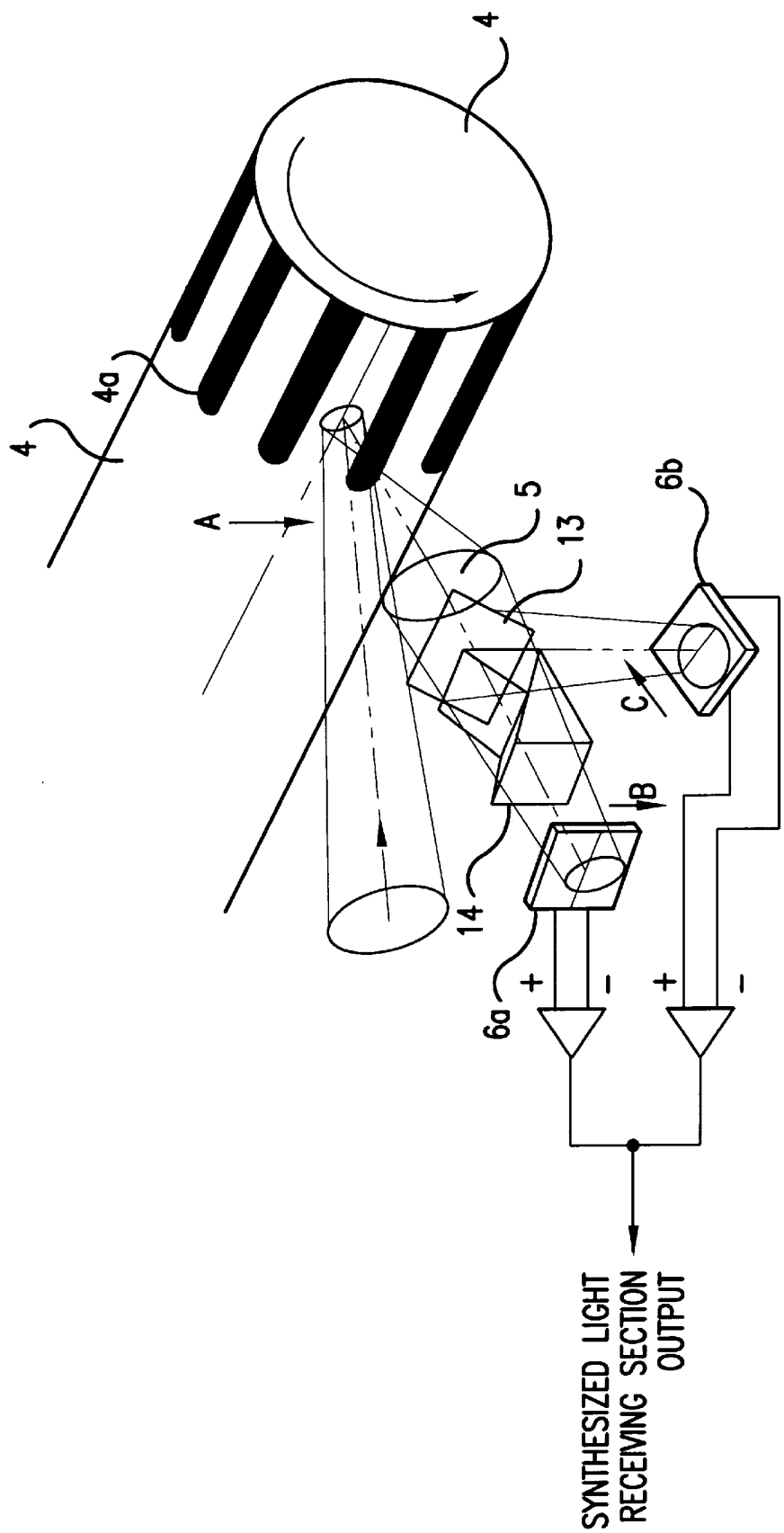
FIG. 22 is a perspective view showing the convergent state of laser beams in case laser beams are focused on the rear side in the laser beam optical system equivalent to the second embodiment of the present invention.
Figure 23:
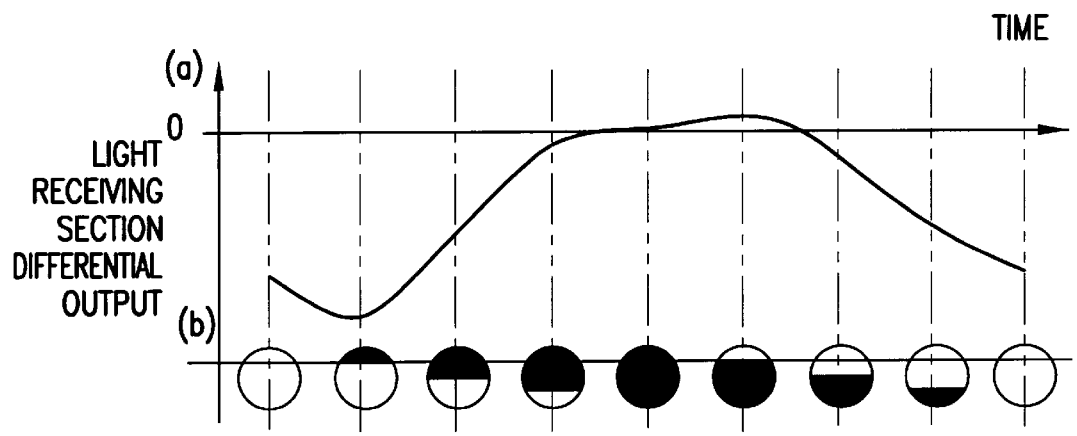
FIGS. 23(a)–23(b) show the time change of the occulting light on a light receiving section 6a of a laser beam when the drum pattern part 4a crosses the laser beam on the surface of the photoconductive drum 4 and light receiving section differential output in case laser beams are focused on the rear side in the laser beam optical system equivalent to the second embodiment of the present invention.
Figure 24:
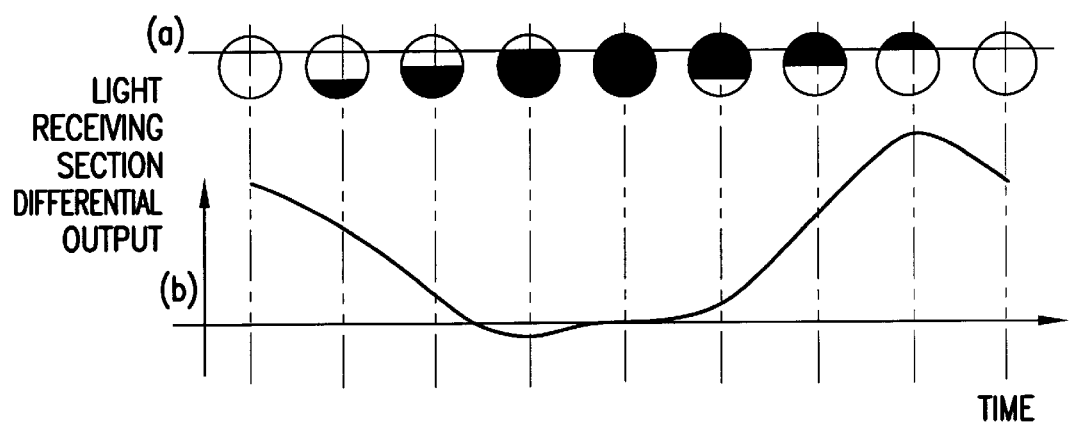
FIGS. 24(a)–24(b) show the time change in the bright and dark conditions of light on a light receiving section 6b of a laser beam when the drum pattern part 4a crosses the laser beam on the surface of the photoconductive drum 4 and light receiving section differential output in case laser beams are focused on the rear side in the laser beam optical system equivalent to the second embodiment of the present invention.

FIGS. 22 to 24 show a case in which a convergent state on the photoconductive drum 4 is a state in which a laser beam is focused on the rear side in this embodiment. In this case, a direction in which a dark part increases on each light receiving surface of the light receiving sections 6a and 6b is reverse to that in the case of a state in which a laser beam is focused on the front side as described in the first embodiment and an output signal without an offset approximating to a sinusoidal wave shown in FIG. 26 (b) is acquired via the same process as described in the case of a state focused on the front side shown in FIGS. 19 to 21.

In this embodiment, as focusing operation which is executed by driving the focusing actuator 12 by the arithmetic circuit 9, the hold circuit 10 and the focusing lens driving circuit 11 is the same as in the first embodiment, the description is omitted.

Next, referring to FIGS. 27 to 32, a laser beam optical system equivalent to a third embodiment of the present invention will be described.

Figure 27:
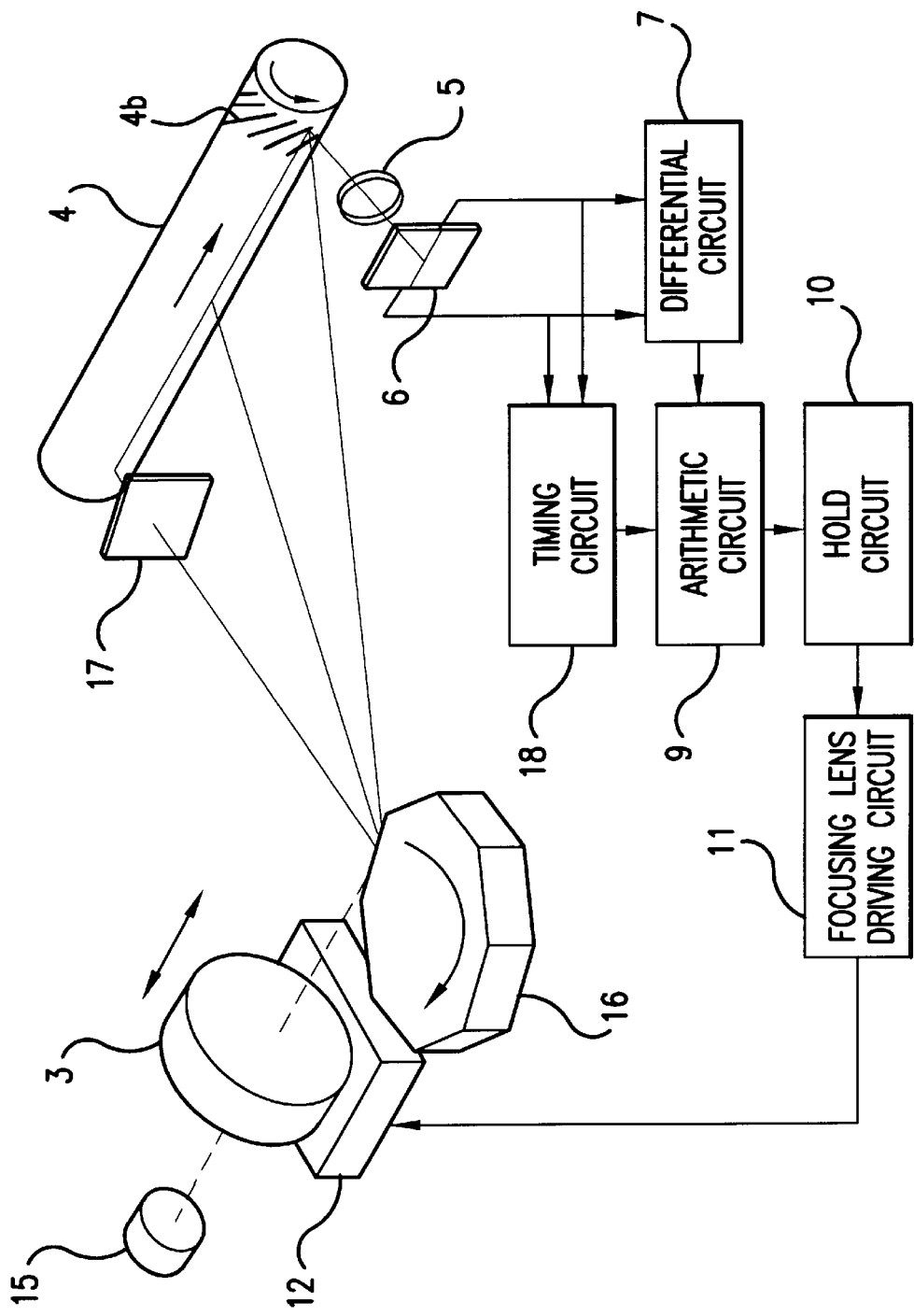
FIG. 27 shows an outline of the constitution of a laser beam optical system equivalent to a third embodiment of the present invention.

FIG. 27 shows an outline of the constitution of the laser beam optical system equivalent to this embodiment. As shown in FIG. 27, the laser beam optical system equivalent to this embodiment is provided with a semiconductor laser 15 consisting of one, two or more light emitting elements. The above laser beam optical system is also provided with a polygon mirror 16 for scanning a laser beam on the photoconductive drum 4 by rotation and SOS sensor 17 for generating a laser beam scanning starting signal (hereinafter called SOS signal) which functions as an instruction to start scanning each cycle in a horizontal scanning direction based upon a laser beam deflected by the polygon mirror 16. The above laser beam optical system is provided with a timing circuit 18 for summing the light receiving sections respectively divided into two of the light receiving sections 6 and generating a signal based upon this value. At the end of the circumferential surface of the photoconductive drum 4, a drum pattern part 4b consisting of a bright and dark banded pattern in which a bright part and a dark part are different in reflectance is formed. Bright and dark fringes constituting the drum pattern part 4b are arranged at a predetermined angle for a horizontal scanning direction or a vertical scanning direction, the predetermined angle may be also fixed on the photoconductive drum 4 or may be also changed according to a predetermined rule, that is, may be also spiral bright and dark fringes.

As the other constitution of the laser beam optical system equivalent to this embodiment is the same as the constitution of the laser beam optical system equivalent to the first embodiment shown in FIG. 1, the description of the other constitution is omitted.

In the above constitution, the polygon mirror 16 is rotated at predetermined rotating speed and a laser beam scans on the photoconductive drum 4, however, at this time, SOS signal is generated at a fixed time interval, the semiconductor laser 15 radiates laser beams according to the SOS signal and predetermined image information is formed on the photoconductive drum 4.

Figure 28:
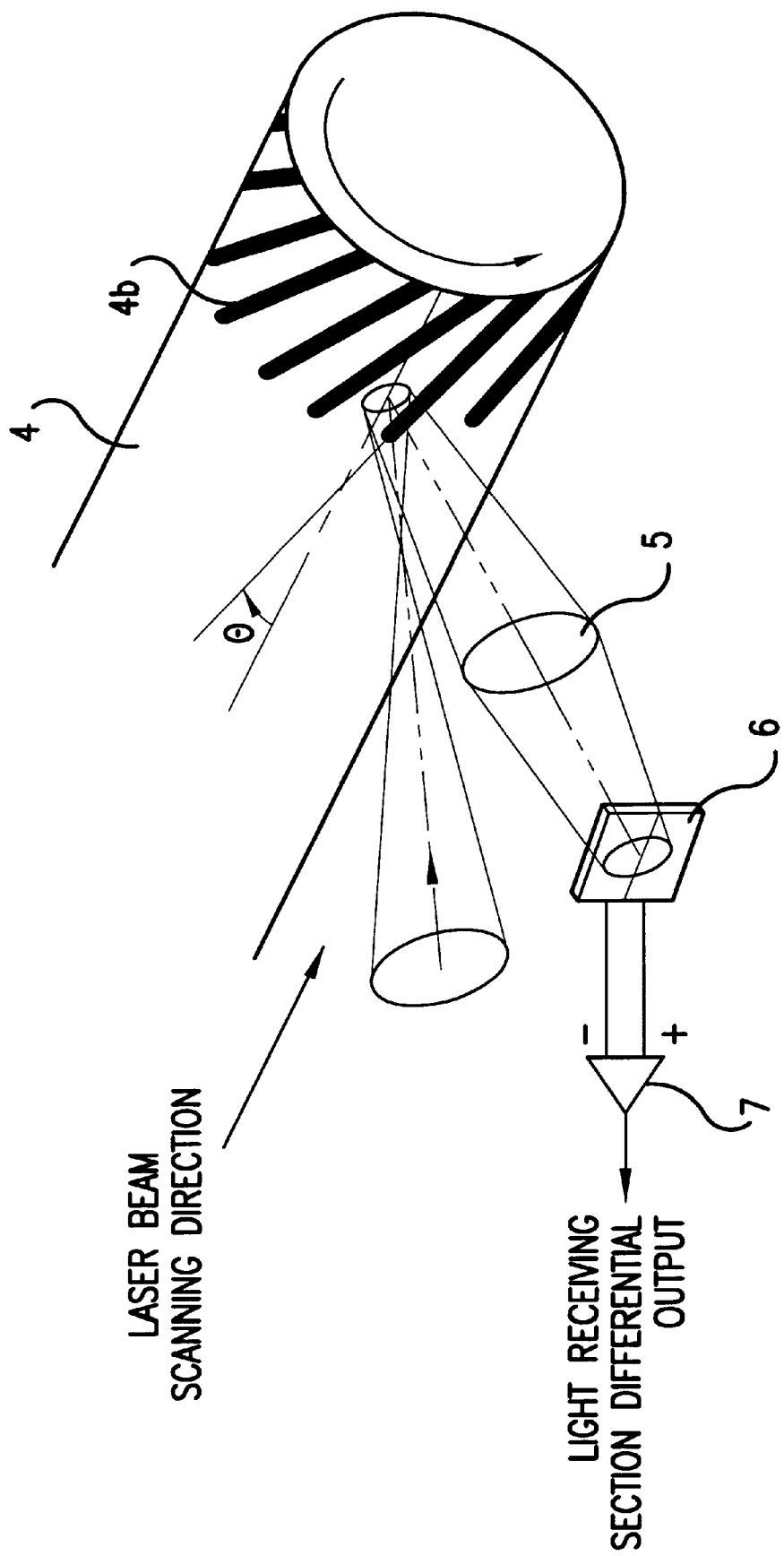
FIG. 28 is a perspective view showing the convergent state of laser beams in case laser beams are focused on the front side in the laser beam optical system equivalent to the third embodiment of the present invention.

FIG. 28 shows a state in which a laser beam outgoing from the semiconductor laser 15 is reflected on the photoconductive drum 4 in a state focused on the front side and the reflected laser beam is focused on the light receiving surface of the light receiving section 6. In this case, a direction in which a laser beam is scanned is a direction shown by an arrow in FIG. 28 and a laser beam is also shifted on the light receiving surface of the light receiving section 6 in the same direction as the scanning direction as a laser beam is scanned. Generally, the rotating speed of the photoconductive drum 4 is slower than scanning speed by the polygon mirror 16 and a direction in which a laser beam shifted in the horizontal scanning direction crosses the bright and dark fringes constituting the drum pattern part 4b is a horizontal scanning direction shown by an arrow in FIG. 28. If an angle θ shown in FIG. 28 is in the range of 0 to 90 degrees even if the rotating speed of the photoconductive drum 4 is fast and a direction in which a laser beam shifted in the horizontal scanning direction crosses the bright and dark fringes constituting the drum pattern part 4b is determined based upon relationship between the direction and scanning speed by the polygon mirror 16, the above direction is necessarily the horizontal scanning direction shown by the arrow in FIG. 28.

Figure 29:
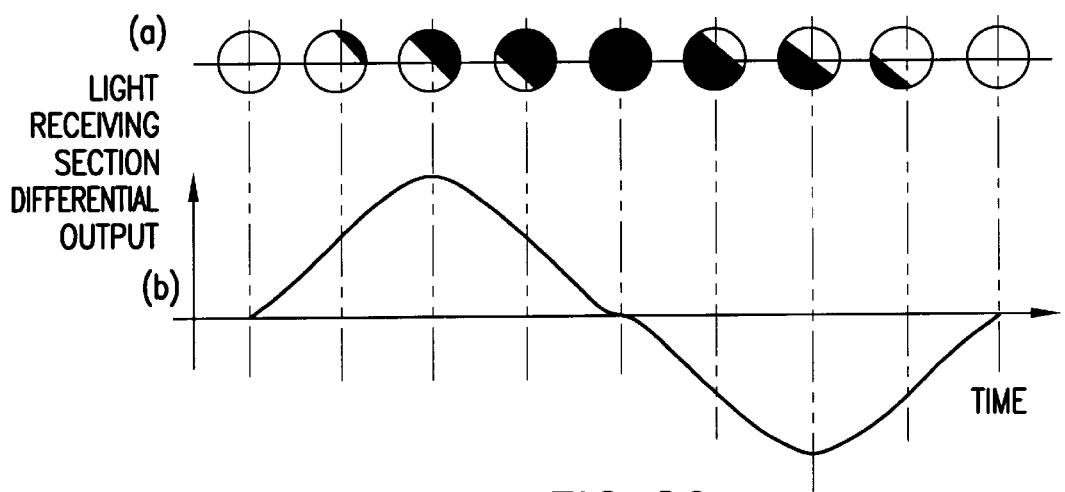
FIGS. 29(a)–29(b) show the time change in the bright and dark conditions of light on the light receiving section 6 of a laser beam when a drum pattern part 4b crosses the laser beam on the surface of the photoconductive drum 4 and light receiving section differential output in case laser beams are focused on the front side in the laser beam optical system equivalent to the third embodiment of the present invention.
Figure 31:
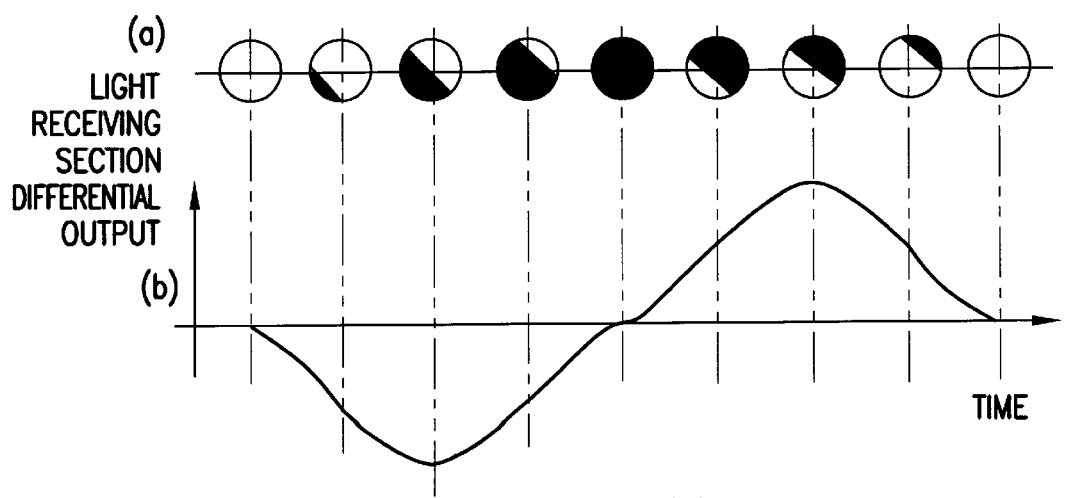
FIGS. 31(a)–31(b) show the time change of the occulting light on the light receiving section 6 of a laser beam when the drum pattern part 4b crosses the laser beam on the surface of the photoconductive drum 4 and light receiving section differential output in case laser beams are focused on the rear side in the laser beam optical system equivalent to the third embodiment of the present invention.

FIG. 29 (a) shows the time change of a bright part and a dark part in the light spot on the light receiving surface of the light receiving section 6 of a laser beam when a bright and a dark part in the above pattern cross the spot of a laser beam converged on the surface of the drum pattern part 4b and FIG. 29 (b) shows the time change of light receiving section differential output acquired in the differential circuit 7 based upon the output at this time of the light receiving section 6. In this case, after a dark part covers the whole spot of a laser beam sequentially from a diagonal direction and a dark part in the bright and dark banded pattern in the drum pattern part 4b passes through the spot of a laser beam, a bright part appears sequentially in the diagonal direction. The above change is the same as in the first embodiment described referring to FIG. 9 and the light receiving section differential output from the differential circuit 7 based upon the output from the light receiving section 6 is output approximating to a sinusoidal wave changing from a positive value to a negative value.

Figure 30:
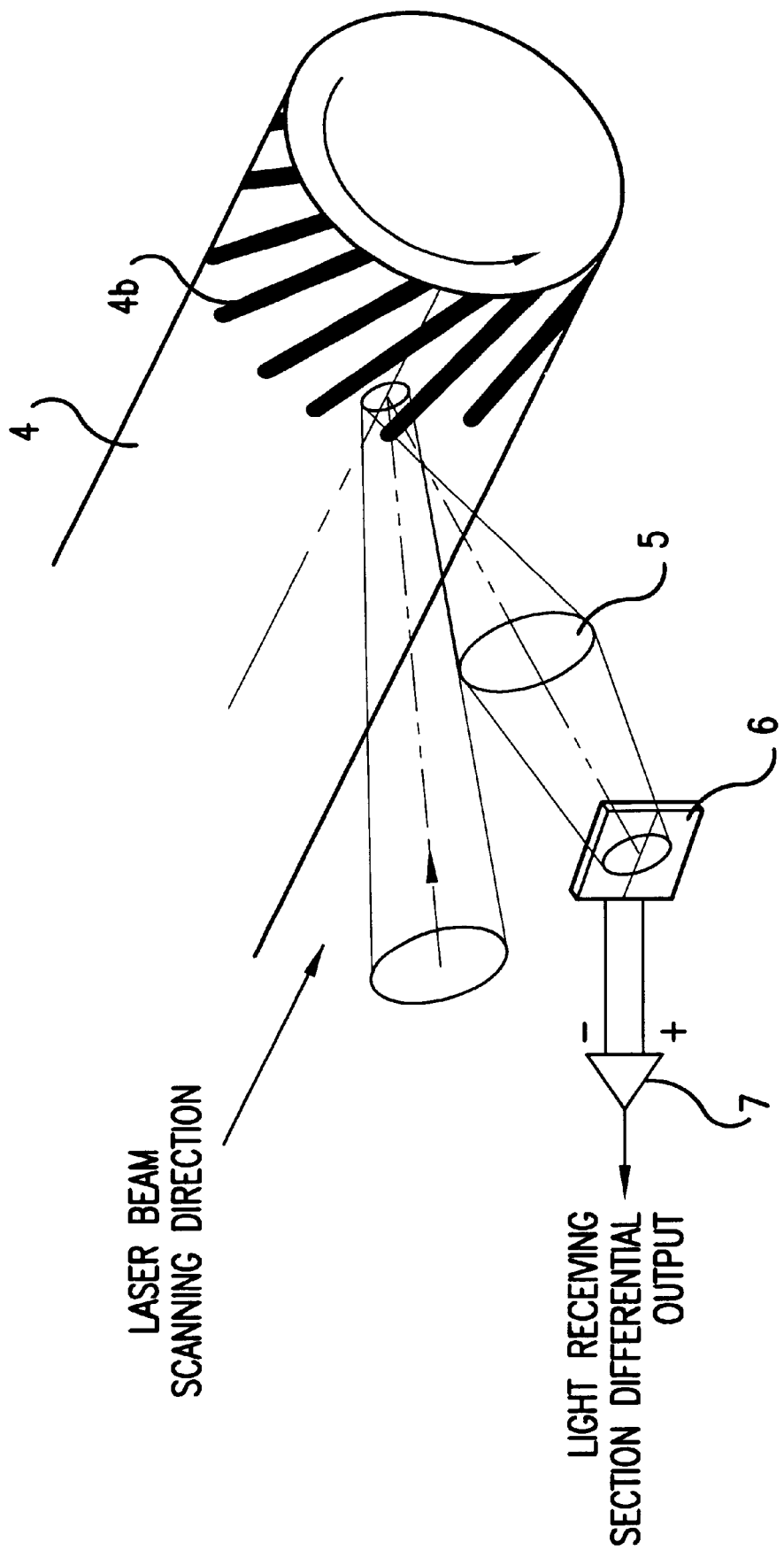
FIG. 30 is a perspective view showing the convergent state of laser beams in case laser beams are focused on the rear side in the laser beam optical system equivalent to the third embodiment of the present invention.

FIG. 30 shows that a laser beam outgoing from the semiconductor laser 15 is reflected on the photoconductive drum 4 in a state focused on the rear side and the reflected laser beam is converged on the light receiving surface of the light receiving section 6. This case is the same as in the first embodiment described referring to FIG. 12, is reverse to the case described referring to FIG. 29 and the light receiving section differential output of the differential circuit 7 based upon the output of the light receiving section 6 is output approximating to a sinusoidal wave changing from a negative value to a positive value.

Figure 32:
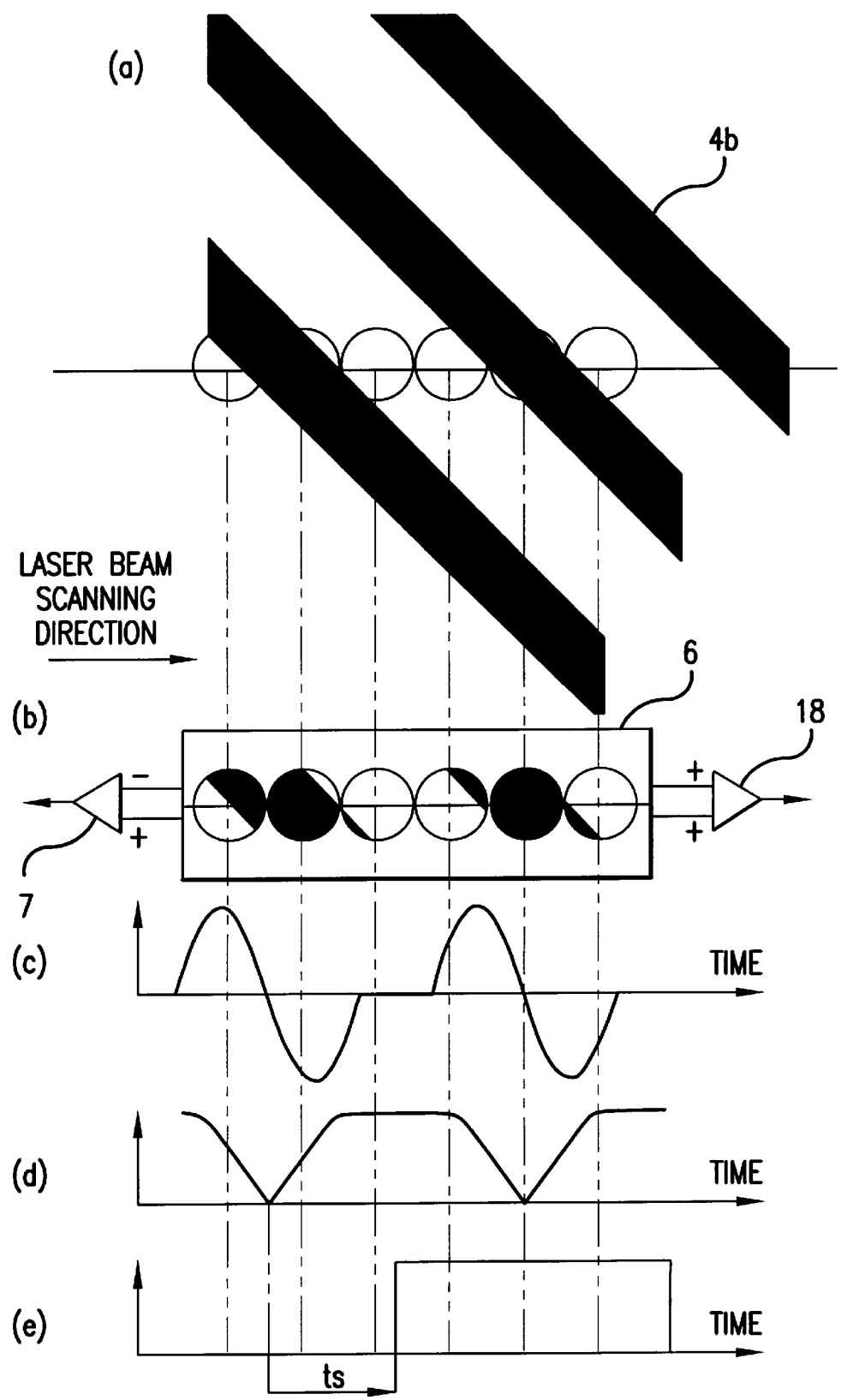
FIGS. 32(a)–32(e) show the track of a scanned laser beam in the vicinity of the bright and dark pattern part 4b (a), the time change of occulting light on the light receiving section 6 (b), output from the differential circuit 7 (c), output from a timing circuit 18 (d) and a sampling period signal (e) in case laser beams are focused on the front side, are reflected on the photoconductive drum 4 and are radiated on the light receiving section 6 in the laser beam optical system equivalent to the third embodiment of the present invention.

FIG. 32 shows a case in which a laser beam outgoing from the semiconductor laser 15 is reflected on the photoconductive drum 4 in a state focused on the front side and the reflected laser beam is converged on the light receiving surface of the light receiving section 6 and FIG. 32 (a) shows the track of the scanning of a laser beam in the vicinity of the drum pattern part 4b. FIG. 32 (b) shows the time change of a bright part and a dark part in a light spot on the light receiving surface of the light receiving section 6. FIG. 32 (c) shows output from the differential circuit 7 and FIG. 32 (d) shows output from the timing circuit 18. FIG. 32 (e) shows a sampling period signal.

A bright part and a dark part in the spot of a laser beam on the light receiving section 6 as a laser beam is shifted in the horizontal scanning direction change as shown in FIG. 32 (b), however, as output from the differential circuit 7 is output approximating to a sinusoidal wave changing from a positive value to a negative value as described referring to FIG. 29 and an output signal from the timing circuit 18 is based upon the sum of the two light receiving sections into which the light receiving section 6 is divided, output from the differential circuit 7 is zero in a position in which the output changes from a positive value to a negative value as shown in FIG. 32 (d). As the above output signal is a signal based upon the sum of the two light receiving sections into which the light receiving section 6 is divided, output is never zero even when a laser beam is completely focused on the photoconductive drum 4. Therefore, a convergent state on the surface of the photoconductive drum 4 can be detected in synchronization with a sampling period signal as signal processing described referring to FIGS. 14 and 15 by detecting the zero cross point of an output signal from the timing circuit 18 and generating a sampling period signal shown in FIG. 32 (e) after a predetermined period ts. As focusing operation based upon continuous ringing acquired by signal processing is the same as in the first embodiment, the description is omitted.

Figure 33A:
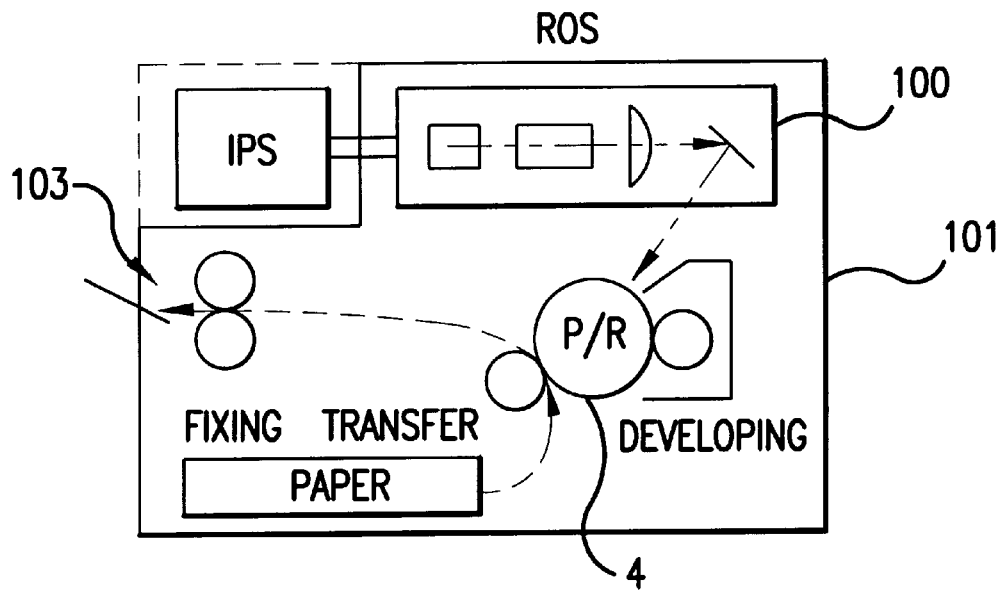
FIGS. 33(a)–33(b) show a monochromatic copying machine in which the laser beam optical system according to the present invention is built and a quadruple-drum color copying machine in which the laser beam optical system according to the present invention is built.
Figure 33B:
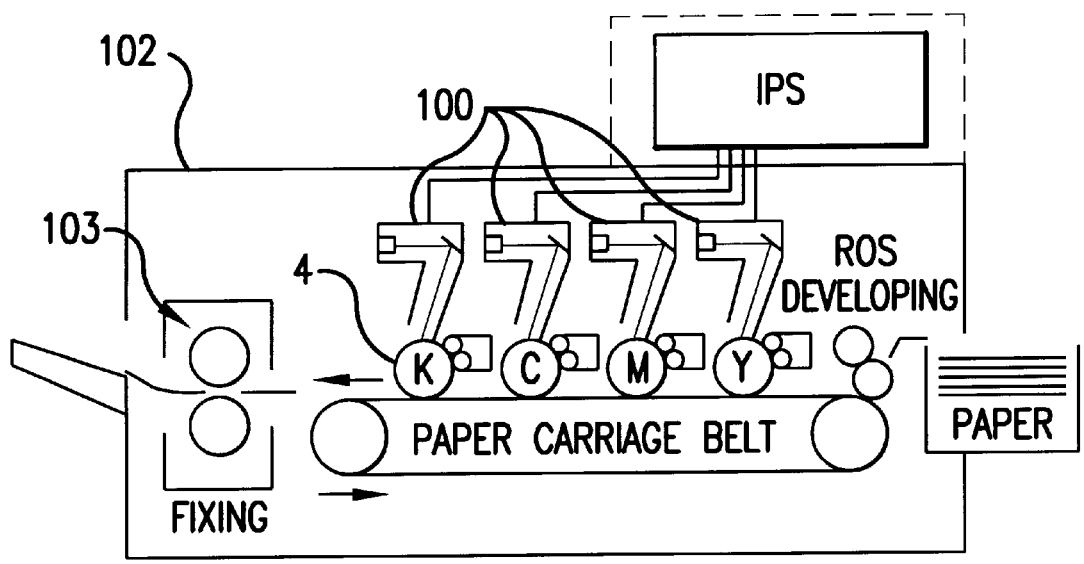
Figure 34:
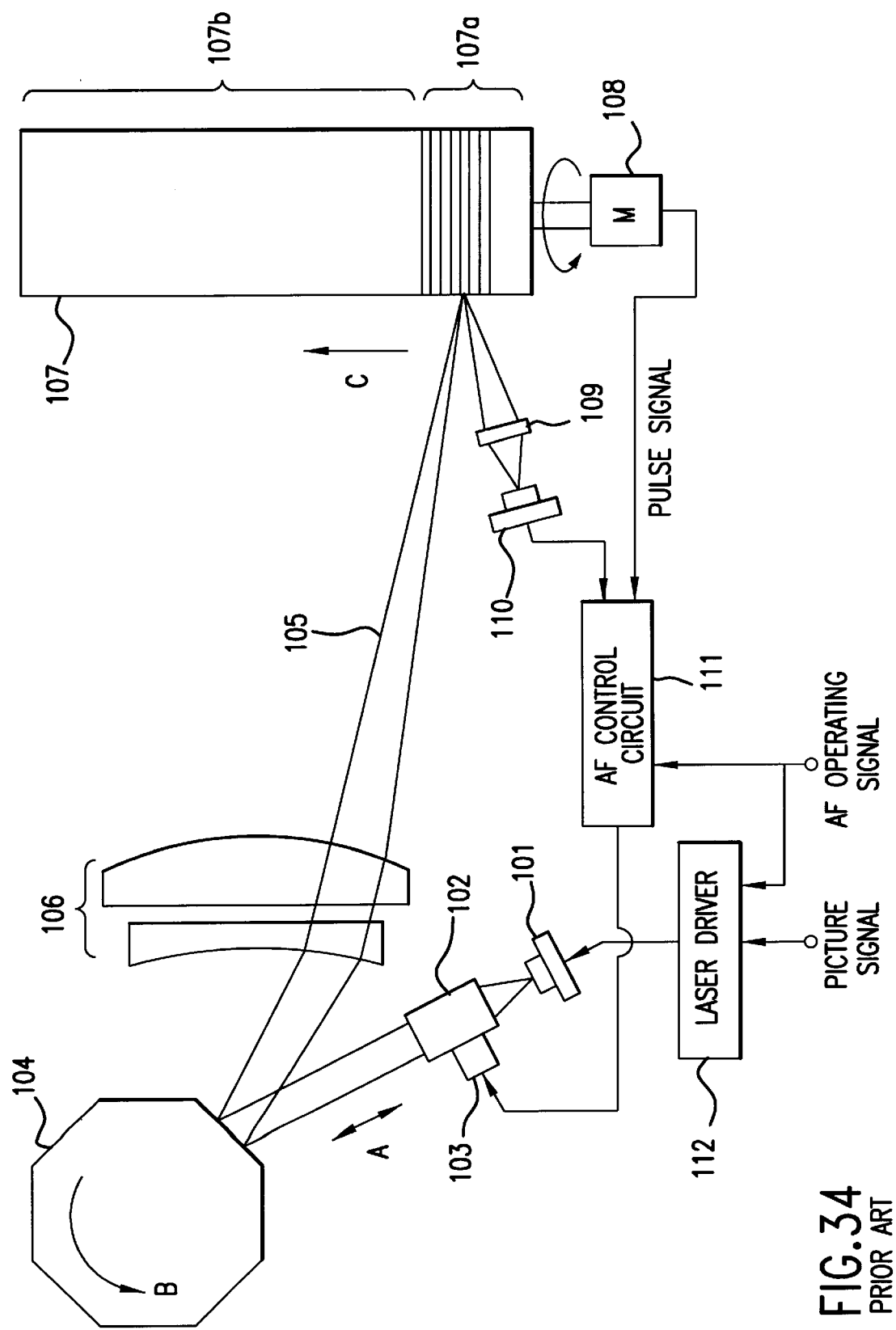
FIG. 34 shows the constitution of a conventional type light beams recorder.

The present invention can be applied variously based upon the above embodiments. For example, a laser beam optical system according to the present invention can be built in an apparatus shown in FIG. 33. FIG. 33 (a) shows an example in which a laser beam optical system 100 according to the present invention is built in a monochromatic copying machine 101 according to an electrophotographic method. For example, if the laser beam optical system equivalent to the first embodiment is used for a scanning optical system (ROS), image data converted to an electric signal is input from an image processing system (IPS), is output as a laser beam from the semiconductor array 1 of the laser beam optical system and is radiated on the photoconductive drum 4. An electrostatic latent image is formed on the photoconductive drum 4 by radiating the laser beam, toner adheres to this electrostatic latent image, the electrostatic latent image is developed and next, after the toner on the photoconductive drum 4 is transferred on paper, the toner is fixed on the paper by a fixing device 103. Focal dislocation is corrected in the above operation as described in the above embodiments.

FIG. 33 (b) shows an example in which the four laser beam optical systems 100 every color according to the present invention are built in a quadruple-drum color copying machine 102 according to an electrophotographic method. The quadruple-drum color copying machine is mainly different from the monochromatic copying machine shown in FIG. 33 (a) in that one photoconductive drum 4 is provided for each color of black (K), indigo (C), vermilion (M) and yellow (Y) to realize color printing. As the operation of the laser beam optical system according to the present invention build every color is the same as the operation of the above monochromatic copying machine shown in FIG. 33 (a), the description is omitted.

The laser beam optical system according to the present invention can be similarly applied to not only a copying machine but the other printer according to an electrophotographic method.

As described above, according to the laser beam optical system according to the present invention, as a reflected laser beam influenced by a bright and dark banded pattern formed on a photoconductive drum is received, it is detected whether the laser beam is focused on the front side of the photoconductive drum or on the rear side and focusing operation is executed according to the above detected state, the variation of the quantity of reflected laser beams and others are not influenced even if toner for forming an image and others adhere to the photoconductive drum and others and the quantity of reflected laser beams decreases or the distribution of the quantity of reflected laser beams is uneven and as focusing operation is not influenced as long as the state of a laser beam is detected, focal dislocation can be corrected with high precision.

Also, according to the laser beam optical system according to the present invention, as it is detected whether a laser beam is focused on the front side of a photoconductive drum or on the rear side as described above, focusing operation is not influenced as long as the state of a laser beam is detected even if the position of light receiving means is varied due to temperature and others and focal dislocation can be corrected with high precision.

Further, according to the laser beam optical system according to the present invention, as it is detected whether a laser beam is focused on the front side of a photoconductive drum or on the rear side as described above, the direction of focal dislocation can be also distinguished and focusing operation is enabled with simple constitution.

What is claimed is:

1. A focusing method, comprising the steps of:
   converging light beams on a rotary image former;
   determining on which side of the front side and the rear side of said image former said light beams are focused, while receiving the reflected light on said image former from said light beams; and
   shifting the focal position of said light beams according to said determination and focusing light beams on said image former.

2. A focusing method, comprising the steps of:
   converging light beams on a bright and dark pattern formed in the circumferential direction of a rotary image former;
   dividedly receiving the reflected light of said light beams modulated by said bright and dark pattern at plural light receiving areas;
   judging on which side of the front side and the rear side of said image former said light beams are focused based upon the time change of difference in light receiving intensity between said plural light receiving areas; and
   shifting the focal position of said light beams according to said judgment and said light beams focused on said image former.

3. A light beam optical system, comprising:
   a light source for radiating light beams;
   optical means for converging said light beams on an image former; and
   convergent state detecting means for detecting the convergent state on said image former of said light beams.

4. A light beam optical system according to claim 3, wherein:
   said convergent state detecting means detects a first convergent state in which said light beams are focused on the front side of said image former and a second convergent state in which said light beams are focused on the rear side of said image former.

5. A light beam optical system according to claim 4, wherein:
   said convergent state detecting means comprises:
     a reflecting section provided with an area different in reflectance in a part of said image former; and
     a detecting section for detecting said first or second convergent state based upon the reflected light of said light beams reflected by said reflecting section.

6. A light beam optical system according to claim 5, wherein:
   said reflecting section is provided with a pattern formed in the rotational direction of said image former so that reflectance varies periodically.

7. A light beam optical system according to claim 5, wherein:

said detecting section is provided with a light receiving section provided with plural light receiving surfaces for dividedly receiving said reflected light into plural areas.

8. A light beam optical system according to claim 7, wherein:

said convergent state detecting means is provided with a focusing optical system arranged between said reflecting section and said light receiving section so that the convergent beams of said reflected light may be always focused on either of the front side or the rear side of said light receiving section for focusing said reflected light.

9. A light beam optical system according to claim 5, wherein:

said detecting section comprises:
an optical element for dividedly receiving said reflected light into first reflected light and second reflected light;
a first light receiving section provided with plural light receiving surfaces for dividedly receiving said first reflected light into plural areas; and
a second light receiving section provided with plural light receiving surfaces for dividedly receiving said second reflected light into plural areas.

10. A light beam optical system according to claim 3, wherein:

said light source radiates light beams for detecting the convergent state of said light beams in addition to light beams modulated according to said picture signal.

11. A light beam optical system according to claim 3, wherein:

control means is further provided for controlling the respective relative positions of said light source, said optical means and said image former based upon said detected convergent state so that said light beams are focused on said image former.

12. An optical system according to claim 11, wherein:

said control means comprises:

an operation section for generating a continuous control signal based upon the reflected light of said light beams discretely detected by said convergent state detecting means; and
a driving section for driving said optical means according to said control signal.

13. An image forming apparatus provided with a rotary photoconductive drum on which light beams modulated according to a picture signal is radiated, developing means for depositing toner on an electrostatic latent image formed on said rotary photoconductive drum and developing it, transfer means for transferring said toner on paper and fixing means for fixing said toner on said paper, said image forming apparatus comprising:

said light beam optical system according to claim 3 mounted thereon.

14. An image forming apparatus, comprising:

an image former;

electrifying means for electrifying said image former;

a light source for radiating light beams modulated according to a picture signal;

optical means for focusing said light beams on said image former;

convergent state detecting means for detecting the convergent state on said image former of said light beams;

control means for controlling the respective relative positions of said light source, said optical means and said image former based upon said detected convergent state so that said light beams may be focused on said image former;

developing means for depositing toner on an electrostatic latent image formed on said image former and developing it;

transfer means for transferring said toner on paper; and fixing means for fixing said toner on said paper.

* * * * *